(12) United States Patent
Yeo et al.

(10) Patent No.: US 11,652,581 B2
(45) Date of Patent: May 16, 2023

(54) APPARATUS AND METHOD FOR MANAGING SOFT BUFFER IN WIRELESS COMMUNICATION SYSTEM

(71) Applicant: Samsung Electronics Co., Ltd., Suwon-si (KR)

(72) Inventors: Jeongho Yeo, Suwon-si (KR); Hyunseok Ryu, Suwon-si (KR); Sungjin Park, Suwon-si (KR); Jinyoung Oh, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 16/994,012

(22) Filed: Aug. 14, 2020

(65) Prior Publication Data
US 2021/0050956 A1 Feb. 18, 2021

(30) Foreign Application Priority Data
Aug. 16, 2019 (KR) .................. 10-2019-0100379

(51) Int. Cl.
*H04L 1/18* (2006.01)
*H04L 12/24* (2006.01)
(Continued)

(52) U.S. Cl.
CPC .......... *H04L 1/1835* (2013.01); *H04L 1/0013* (2013.01); *H04L 1/1812* (2013.01); *H04L 41/0803* (2013.01)

(58) Field of Classification Search
CPC ... H04L 1/1835; H04L 1/0013; H04L 1/1812; H04L 41/0803; H04L 1/0068; H04L 1/0067; H04W 24/02
(Continued)

(56) References Cited

U.S. PATENT DOCUMENTS

2015/0312371 A1* 10/2015 Han .................. H04W 4/70 370/281
2018/0110057 A1 4/2018 Park et al.
(Continued)

FOREIGN PATENT DOCUMENTS

EP 3 989 507 A1 4/2022
WO 2017/123337 A1 7/2017

OTHER PUBLICATIONS

"NR Sidelink Physical Layer Structure", R1-1906205, May 3, 2019.
(Continued)

*Primary Examiner* — Gbemileke J Onamuti
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system, such as Long Term Evolution (LTE). The disclosure is to transmit or receive data and control information in a wireless communication system. A method for operating a terminal includes receiving indication on limited-buffer rate-matching (LBRM) from a base station, acquiring at least one parameter required in order to perform the LBRM, determining a limited range of parity bits for the LBRM based on the at least one parameter, and transmitting or receiving data based on the limited range.

20 Claims, 22 Drawing Sheets

(51) Int. Cl.
    *H04L 1/00*         (2006.01)
    *H04L 1/1829*    (2023.01)
    *H04L 41/0803*  (2022.01)
    *H04L 1/1812*    (2023.01)

(58) Field of Classification Search
    USPC .......................................................... 370/329
    See application file for complete search history.

(56) References Cited

U.S. PATENT DOCUMENTS

| | | | |
|---|---|---|---|
| 2019/0141647 A1* | 5/2019 | Nimbalker | H04L 5/001 |
| 2019/0223160 A1 | 7/2019 | He et al. | |
| 2020/0274635 A1* | 8/2020 | Chen | H04L 1/0016 |
| 2021/0377927 A1* | 12/2021 | Kusashima | H04W 72/0406 |

OTHER PUBLICATIONS

International Search Report and written opinion dated Nov. 27, 2020, issued in International application No. PCT/KR2020/010916.
European Search Report dated Sep. 12, 2022, issued in European Application No. 20855023.6.

\* cited by examiner

APPARATUS AND METHOD FOR MANAGING SOFT BUFFER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0100379, filed on Aug. 16, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for managing a soft buffer of a terminal in a wireless communication system.

2. Description of Related Art

To meet the demand for wireless data traffic having increased since deployment of $4^{th}$ generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (millimeter (mm)Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a wireless communication system, such as a 5G system evolves, it is expected that various services can be provided. Therefore, there is a need for seamlessly providing these services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively operating a memory or a soft buffer of a receiver in a wireless communication system.

Another aspect of the disclosure is to provide a data-rate-matching method and apparatus in a wireless communication system.

Another aspect of the disclosure is to provide an apparatus and a method for limiting transmittable parity bits in a wireless communication system.

Another aspect of the disclosure is to provide an apparatus and a method for determining the range within which transmittable parity bits are limited in a wireless communication system.

Another aspect of the disclosure is to provide an apparatus and a method for determining parameters used in order to determine the range within which transmittable parity bits are limited in a wireless communication system.

Additional aspects will be set forth in part in the description which follows and, in part, will be apparent from the description, or may be learned by practice of the presented embodiments.

In accordance with an aspect of the disclosure, a method for operating a terminal in a wireless communication system is provided. The method includes receiving configuration information related to sidelink communication from a base station, determining parameters required in order to perform limited-buffer rate-matching (LBRM) for the sidelink communication, determining a limited range of parity bits for the LBRM based on the parameters, and transmitting or receiving sidelink data based on the limited range.

In accordance with another aspect of the disclosure, a terminal in a wireless communication system is provided. The terminal includes a transceiver, and at least one processor connected to the transceiver. The at least one processor performs control to receive configuration information related to sidelink communication from a base station, determine parameters required in order to perform limited-buffer rate-matching (LBRM) for the sidelink communication, determine a limited range of parity bits for the LBRM based on the parameters, and transmit or receive sidelink data based on the limited range.

An apparatus and a method according to various embodiments of the disclosure enable efficient management of a soft buffer of a terminal when terminals communicate with each other, and enable a transmitting and a receiving terminal to have a common understanding therebetween, thereby enabling the terminals to communicate with each other.

Effects obtainable from the disclosure may not be limited to the above mentioned effects, and other effects which are not mentioned may be clearly understood, through the following descriptions, by those skilled in the art to which the disclosure pertains.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
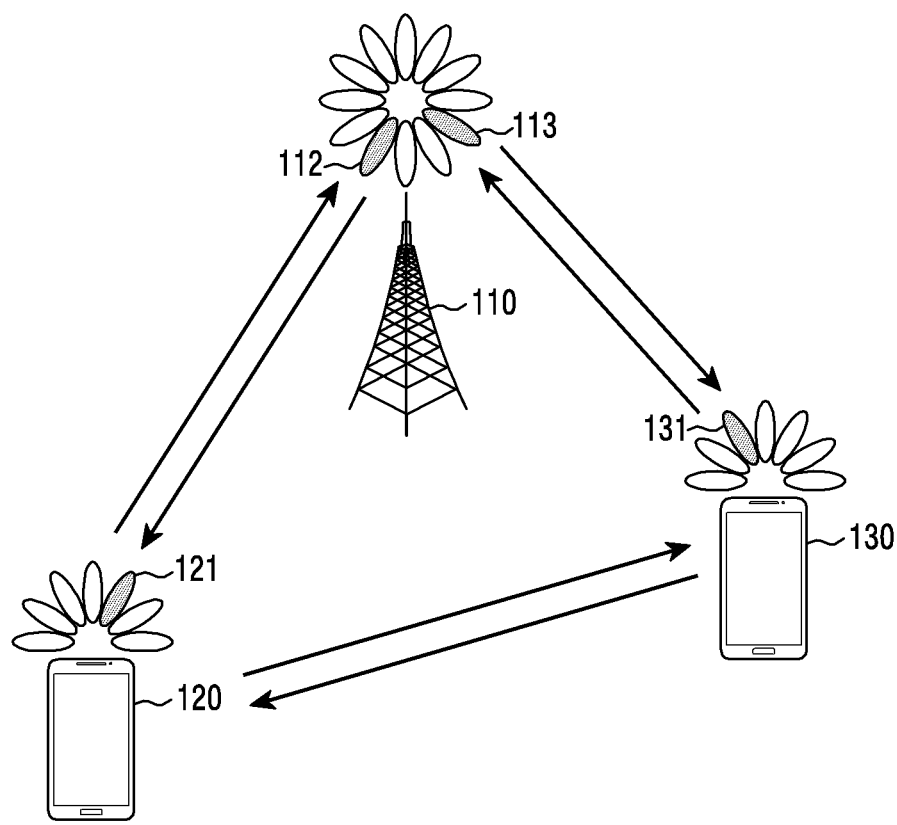
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments of the disclosure, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for managing a soft buffer in a wireless communication system. Specifically, the disclosure describes a technology that is used, when a signal transmitted after channel coding has arrived at a receiver in a wireless communication system, to determine, by the receiver, a soft buffer for storing a reception signal or a modified reception signal, and to determine, by a transmission terminal, parity bits transmitted based on the determination on the soft buffer.

Terms indicating a signal, terms indicating a channel, terms indicating control information, terms indicating network entities, terms indicating a configuration element of an apparatus, and the like, which are used hereinafter, are selected for the convenience of description. Accordingly, the disclosure is not limited to the terms used below, and other terms having equivalent technical meanings may be used.

Hereinafter, the terms "physical channel" and "signal" may be interchangeably used with "data" or "control signal". For example, a physical downlink shared channel (PDSCH) is a term used to indicate a physical channel through which data is transmitted, but PDSCH may be used to indicate data.

Hereinafter, in the disclosure, higher-layer signaling indicates a method of transmitting a signal from a base station to a terminal using a downlink data channel of a physical layer, or a method of transmitting a signal from a terminal to a base station using an uplink data channel of a physical layer. The higher-layer signaling may be understood to be radio resource control (RRC) signaling or a medium access control (MAC) control element (hereinafter, referred to as "CE").

Further, in the disclosure, where the expression "more than" or "less than" is used in order to determine whether or not a specific condition is satisfied or fulfilled, this is merely intended to express an example, this does not exclude the meaning of "equal to or more than" or "equal to or less than". A condition described using the expression "equal to or more than" can be replaced with the expression "more than", a condition described using the expression "equal to or less than" can be replaced with the expression "less than", and a condition described using the expression "equal to or more than and less than" can be replaced with the expression "more than and equal to or less than".

Further, although the disclosure describes various embodiments using terms used in some communication standards (e.g., 3rd Generation Partnership Project (3GPP)), these are merely illustrative examples. Various embodiments can be easily modified and applied to other communication systems as well.

FIG. 1 illustrates a wireless communication system according to an embodiment of the disclosure. FIG. 1 illustrates a base station 110, a terminal 120, and a terminal 130, as some of nodes using a wireless channel in a wireless communication system. FIG. 1 illustrates a single base station, but may further include a base station identical to the base station 110 or other base stations similar thereto.

Referring to FIG. 1, the base station 110 is a network infrastructure for providing radio access to the terminals 120 and 130. The base station 110 has a coverage defined as a predetermined geographical region based on the distance within which a signal is capable of being transmitted. The base station 110 may be referred to as an "access point (AP)", an "eNodeB (eNB)", a "5th generation (5G) node", a "gNodeB (next generation nodeB or gNB)", a "wireless point", a "transmission/reception point (TRP)", or other terms having technical meanings equivalent to those of the above-described terms, in addition to "base station".

Each of the terminal 120 and the terminal 130 is a device used by a user, and performs communication with the base station 110 through a wireless channel. A link from the base station 110 to the terminal 120 or the terminal 130 is referred to as a downlink (DL), and a link from the terminal 120 or the terminal 130 to the base station 110 is referred to as an uplink (UL). Further, the terminal 120 and the terminal 130 may communicate with each other through a wireless channel. In this case, a link between the terminal 120 and the terminal 130 (device-to-device link (D2D)) is referred to as a sidelink, and the sidelink may be interchangeably used with a PC5 interface. In some cases, at least one of the terminal 120 and the terminal 130 may be operated without a user's involvement. For example, at least one of the terminal 120 and the terminal 130 may be a device for performing machine-type communication (MTC), and may not be carried by a user. Each of the terminal 120 and the terminal 130 may be referred to as a "user equipment (UE)", a "mobile station (MS)", a "subscriber station", a "remote terminal", a "wireless terminal", a "user device", or other terms having technical meanings equivalent to those of the above-described terms, in addition "terminal".

The base station 110, the terminal 120, and the terminal 130 may transmit and receive a wireless signal in a millimeter wave (mmWave) band (e.g., 28 GHz, 30 GHz, 38 GHz, and 60 GHz). In this case, to improve a channel gain, the base station 110, the terminal 120, and the terminal 130 may perform beamforming. Here, the beamforming may include transmission beamforming and reception beamforming. For example, the base station 110, the terminal 120, and the terminal 130 may assign directivity to a transmission signal and a reception signal. To this end, the base station 110 and the terminals 120 and 130 may select serving beams 112, 113, 121, and 131 through a beam search and a beam management procedure. After the serving cells 112, 113, 121, and 131 are selected, communication may be performed through resources having a quasi co-located (QCL) relationship with the resources that transmitted the serving beams 112, 113, 121, and 131.

When large-scale characteristics of a channel having transmitted symbols on a first antenna port are inferred based on a channel having transmitted symbols on a second antenna port, the first and the second antenna port may be determined to be in a QCL relationship. For example, the large-scale characteristics may include at least one of a delay spread, a Doppler spread, a Doppler shift, an average gain, an average delay, and a spatial receiver parameter.

Figure 2:
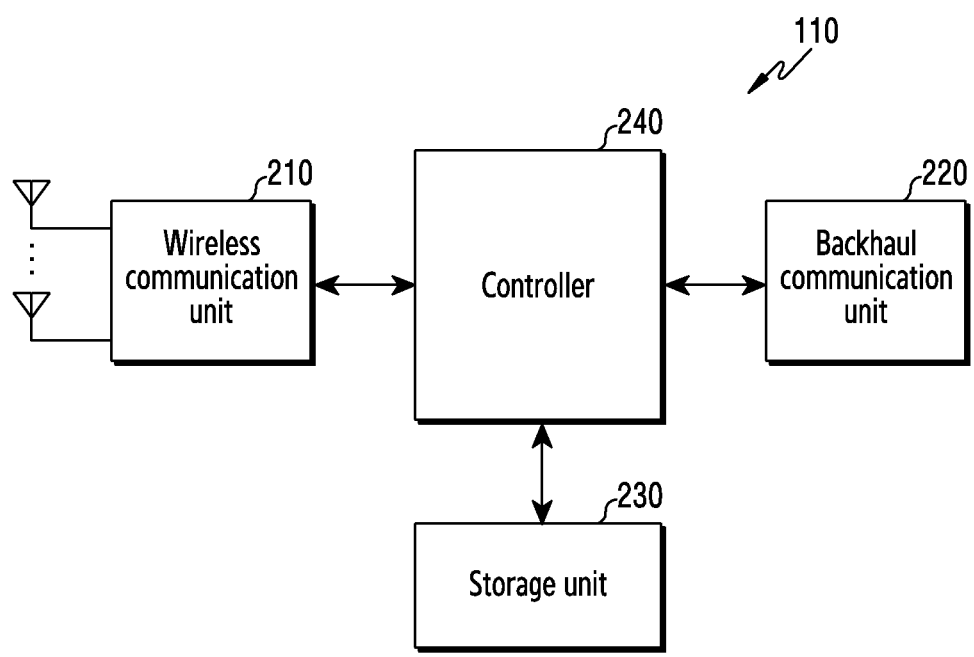
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 may be understood as a configuration of the base station 110. The term "unit", "-or/er", or the like, to be used below may indicate a unit for processing at least one function or operation, and may be implemented by hardware, software, or a combination thereof.

Referring to FIG. 2, the base station includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 may perform a function of conversion between a baseband signal and a bitstream according to a physical-layer standard of the system. For example, when transmitting data, the wireless communication unit 210 may encode and modulate a transmission bitstream to generate complex symbols. In addition, when receiving data, the wireless communication unit 210 may demodulate and decode a baseband signal to restore a reception bitstream.

In addition, the wireless communication unit 210 up-converts a baseband signal into a radio frequency (RF) band signal and then transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog converter (DAC), an analog-to-digital converter (ADC), and the like. Further, the wireless communication unit 210 may also include multiple transmission/reception paths. Furthermore, the wireless communication unit 210 may include at least one antenna array including multiple antenna elements.

In terms of hardware, the wireless communication unit 210 may include a digital unit and an analog unit. The analog unit may include multiple sub-units according to operating power, operating frequency, and the like. The digital unit may be implemented by at least one processor (e.g., a digital signal processor (DSP)).

As described above, the wireless communication unit 210 transmits and receives a signal. Accordingly, some or the entirety of the wireless communication unit 210 may be referred to as a "transmitter", a "receiver", or a "transceiver". In addition, hereinafter, transmission and reception performed through a wireless channel are used to have a meaning including the processing performed by the wireless communication unit 210 as described above.

The backhaul communication unit 220 provides an interface for performing communication with other nodes in the network. For example, the backhaul communication unit 220 converts a bitstream transmitted from the base station to another node, for example, another access node, another base station, a higher node, a core network, or the like, into a physical signal, and converts a physical signal received from another node into a bitstream.

The storage unit 230 stores a basic program for operating a base station, an application program, and data, such as configuration information. The storage unit 230 may include volatile memory, nonvolatile memory, and a combination of volatile memory and nonvolatile memory. The storage unit 230 provides data stored according to a request from the controller 240.

The controller 240 controls the overall operation of the base station. For example, the controller 240 may transmit and receive a signal through the wireless communication unit 210 or the backhaul communication unit 220. In addition, the controller 240 records data in the storage unit 230 and reads the recorded data therefrom. The controller 240 may perform the functions of a protocol stack required by a communication standard. According to another embodiment of the disclosure, the protocol stack may be included in the wireless communication unit 210. To this end, the controller 240 may include at least one processor. According to various embodiments of the disclosure, the controller 240 may control the base station to perform operations according to various embodiments to be described below.

Figure 3:
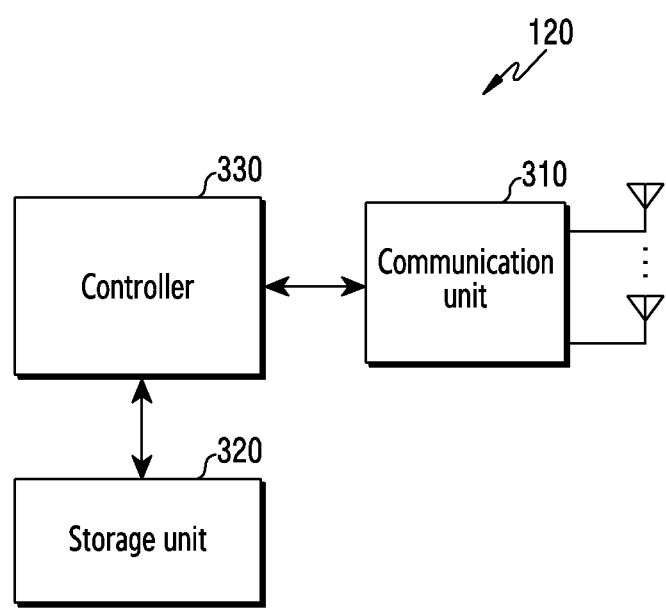
FIG. 3 illustrates a configuration of a terminal in a wireless communication system according to an embodiment of the disclosure.

FIG. 3 illustrates a configuration of a terminal in a wireless communication system according to an embodiment of the disclosure. The configuration illustrated in FIG. 3 may be understood to be a configuration of the terminal 120. The term "unit", "-or/er", or the like, to be used below may indicate a unit for processing at least one function or operation, and may be implemented by hardware, software, or a combination thereof.

Referring to FIG. 3, the terminal includes a communication unit 310, a storage unit 320, and a controller 330.

The communication unit 310 performs functions for transmitting or receiving a signal through a wireless channel. For example, the communication unit 310 performs a function of conversion between a baseband signal and a bitstream according to a physical-layer standard of the system. For example, when transmitting data, the communication unit 310 encodes and modulates a transmission bitstream to generate complex symbols. In addition, when receiving data, the communication unit 310 demodulates and decodes a baseband signal to restore a reception bitstream. In addition, the communication unit 310 up-converts a baseband signal into an RF base signal and then transmits the RF band signal through an antenna, and down-converts an RF base signal received through an antenna into a baseband signal. For example, the communication unit 310 may include a transmission filter, a reception filter, an amplifier, a mixer, an oscillator, a DAC, an ADC, and the like.

In addition, the communication unit 310 may include multiple transmission/reception paths. Furthermore, the communication unit 310 may include at least one antenna array including multiple antenna elements. In terms of hardware, the communication unit 310 may include a digital circuit and an analog circuit (e.g., a radio frequency integrated circuit (RFIC)). Here, the digital circuit and the analog circuit may be implemented in a single package. The communication unit 310 may also include multiple RF chains. Moreover, the communication unit 310 may perform beamforming.

As described above, the communication unit 310 transmits and receives a signal. Accordingly, some or all of the communication unit 310 may be referred to as a "transmitter", a "receiver", or a "transceiver". In addition, hereinafter, transmission and reception performed through a wireless channel are used to have a meaning including the processing performed by the communication unit 310 as described above.

The storage unit 320 stores a basic program for operating the terminal, an application program, and data, such as configuration information. The storage unit 320 may include volatile memory, nonvolatile memory, and a combination of volatile memory and nonvolatile memory. The storage unit 320 provides data stored therein in response to a request from the controller 330.

The controller 330 controls the overall operation of the terminal. For example, the controller 330 transmits and receives a signal through the communication unit 310. In addition, the controller 330 records data in the storage unit 320 and reads the recorded data therefrom. The controller 330 may perform the functions of a protocol stack required by the communication standard. To this end, the controller 330 may include at least one processor or a micro-processor, or may be a part of a processor. Further, a part of the communication unit 310 and the controller 330 may be referred to as a communication processor (CP). According to various embodiments of the disclosure, the controller 330 may control the terminal to perform operations according to various embodiments to be described below.

Figure 4:
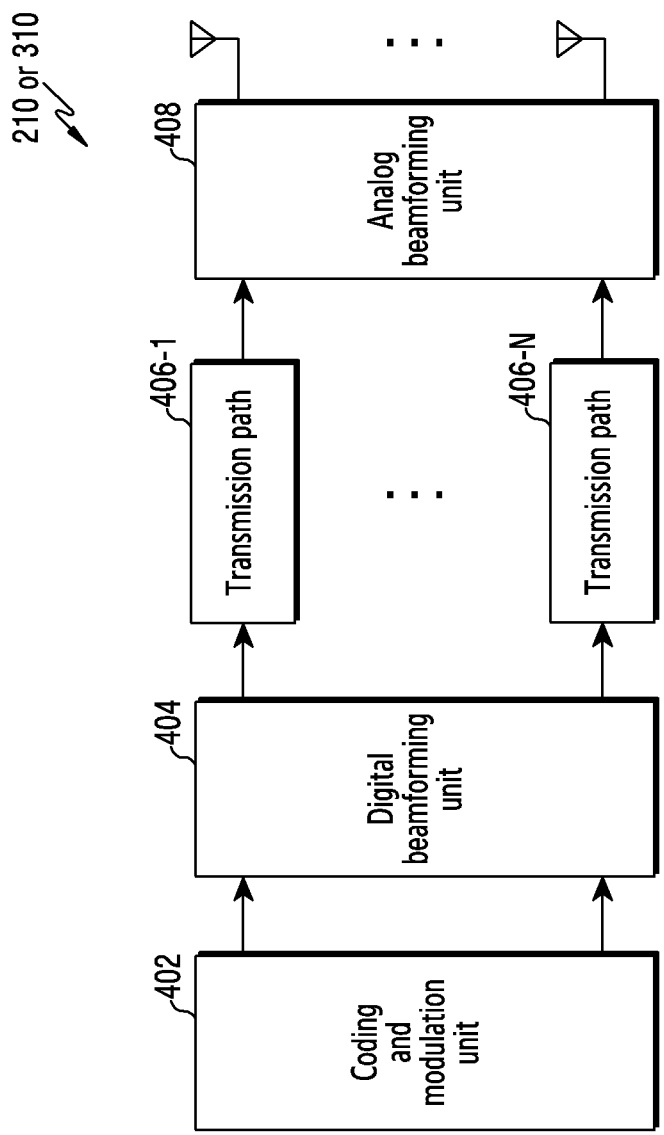
FIG. 4 illustrates a configuration of a communication unit in a wireless communication system according to an embodiment of the disclosure.

FIG. 4 illustrates a configuration of a communication unit in a wireless communication system according to an embodiment of the disclosure. FIG. 4 illustrates an example of configuration of the wireless communication unit 210 of FIG. 2 and the communication unit 310 of FIG. 3. Specifically, FIG. 4 illustrates elements for performing beamforming as a part of the wireless communication unit 210 of FIG. 2 or the communication unit 310 of FIG. 3.

Referring to FIG. 4, the wireless communication unit 210 or the communication unit 310 includes a coding and modulation unit 402, a digital beamforming unit 404, multiple transmission paths 406-1 to 406-N, and an analog beamforming unit 408.

The coding and modulation unit 402 performs channel encoding. For the channel encoding, at least one of a low-density parity check (LDPC) code, a convolution code, and a polar code may be used. The coding and modulation unit 402 performs constellation mapping to generate complex symbols.

The digital beamforming unit 404 performs beamforming on a digital signal (e.g., complex symbols). To this end, the digital beamforming unit 404 multiplies the modulated symbols by beamforming weights. Here, the beamforming weights are used to change the magnitude or the phase of a signal, and may be referred to as a "precoding matrix", a "precoder", and the like. The digital beamforming unit 404 outputs the modulated symbols having passed through the digital beamforming to the multiple transmission paths 406-1 to 406-N. In this case, according to a multiple-input multiple-output (MIMO) transmission technique, the modulated symbols may be multiplexed, or the same modulated symbols may be provided to the multiple transmission paths 406-1 to 406-N.

The multiple transmission paths 406-1 to 406-N convert the digital signals having passed through the digital beamforming into analog signals. To this end, each of the multiple transmission paths 406-1 to 406-N may include an inverse fast Fourier transform (IFFT) calculator, a cyclic prefix (CP) inserter, a DAC, and an up-converter. The CP inserter is used for an orthogonal frequency-division multiplexing (OFDM) scheme, and may be excluded when another physical-layer scheme (e.g., a filter bank multi-carrier (FBMC) scheme) is applied. For example, the multiple transmission paths 406-1 to 406-N provide an independent signal-processing process with respect to multiple streams generated by the digital beamforming. However, depending on an implementation method, some of elements of the multiple transmission paths 406-1 to 406-N may be shared.

The analog beamforming unit 408 performs beamforming on an analog signal. To this end, the analog beamforming unit 408 multiplies analog signals by beamforming weights. Here, the beamforming weights are used to change the magnitude and the phase of a signal. Specifically, depending on the connection structure between the multiple transmission paths 406-1 to 406-N and antennas, the analog beamforming unit 408 may be configured in various ways. For example, each of the multiple transmission paths 406-1 to 406-N may be connected to one antenna array. In another example, the multiple transmission paths 406-1 to 406-N may be connected to one antenna array. In still another example, the multiple transmission paths 406-1 to 406-N may be adaptively connected to one antenna array, or may be connected to two or more antenna arrays.

Wireless communication systems have expanded beyond the original role of providing voice-oriented service and have evolved into wideband wireless communication systems that provide a high-speed and high-quality packet data service according to, for example, communication standards, such as high-speed packet access (HSPA), long term evolution (LTE or evolved universal terrestrial radio access (E-UTRA)), and LTE-Advanced (LTE-A) of 3GPP, high-rate packet data (HRPD) and a ultra-mobile broadband (UMB) of 3GPP2, and 802.16e of IEEE. Furthermore, communication standards of 5G or new radio (NR) are being developed as 5th generation wireless communication systems.

A NR system adopts an orthogonal frequency-division multiplexing (OFDM) scheme in a downlink (DL) and an uplink. More specifically, a cyclic-prefix OFDM (CP-OFDM) scheme has been adopted in the downlink, and a discrete Fourier transform spreading OFDM (DFT-s-OFDM) scheme has been adopted together with the CP-OFDM scheme in the uplink. The uplink is a wireless link through which data or a control signal is transmitted from a terminal to a base station, and the downlink is a wireless link through which data or a control signal is transmitted from a base station to a terminal. In a multiple-access scheme, normally, data or control information is distinguished according to users by assigning or managing time-frequency resources for carrying data or control information of each user, wherein the time-frequency resources do not overlap, that is, orthogonality is established.

An NR system adopts a hybrid automatic repeat request (HARQ) scheme of retransmitting corresponding data in a physical layer when decoding failure occurs upon initial transmission. According to the HARQ scheme, when a receiver fails to accurately decode data, the receiver may transmit negative acknowledgement (NACK), which is information indicating decoding failure, to a transmitter, wherein the transmitter retransmits the corresponding data in the physical layer. The receiver may combine data retransmitted by the transmitter with data that previously failed to be decoded, thereby increasing the performance of data reception. Furthermore, when the receiver accurately decodes data, the receiver may transmit acknowledgement (ACK), which is information indicating successful decoding, to the transmitter, whereby the transmitter transmits new data.

Figure 5:
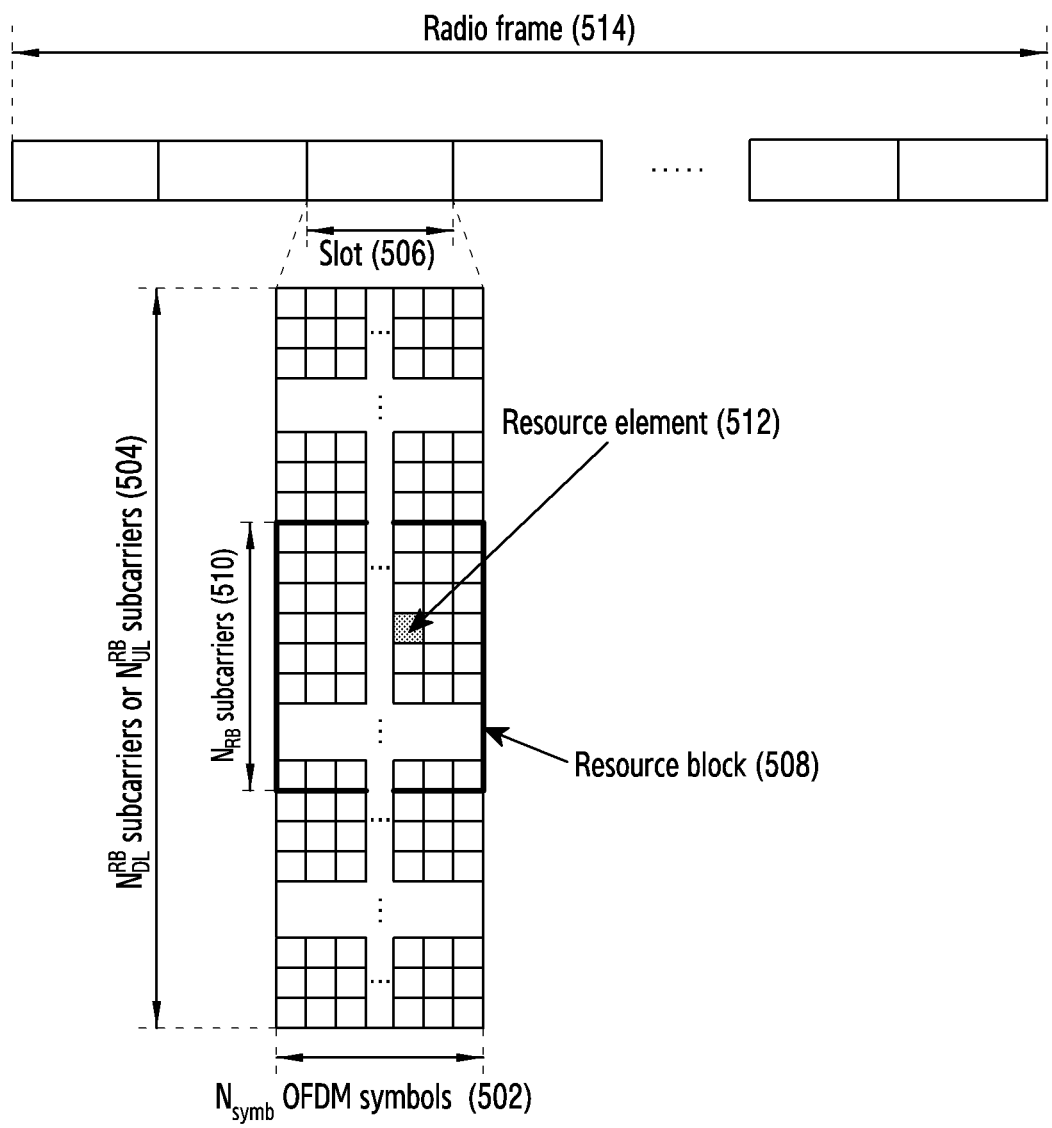
FIG. 5 illustrates a time-frequency-domain resource structure in a wireless communication system according to an embodiment of the disclosure.

FIG. 5 illustrates a time-frequency-domain resource structure in a wireless communication system according to an embodiment of the disclosure. FIG. 5 illustrates the basic structure of a time-frequency domain that is a wireless resource area in which data or a control channel is transmitted in the downlink and the uplink.

Referring to FIG. 5, a horizontal axis represents a time domain, and a vertical axis represents a frequency domain. In the time domain, the minimum transmission unit is an OFDM symbol, and $N_{symb}$ OFDM symbols 502 constitute one slot 506. The length of a subframe is defined as 1.0 ms, and the length of a radio frame 514 is defined as 10 ms. In the frequency domain, the minimum transmission unit is a subcarrier, and a total of $N_{BW}$ subcarriers 504 constitutes the entire system transmission bandwidth.

A basic unit of a resource in the time-frequency domain is a resource element (RE) 512, and the resource element 512 may be indicated as an OFDM symbol index and a subcarrier index. A resource block (RB or a physical resource block (PRB)) 508 is defined as $N_{symb}$ consecutive OFDM symbols 502 in the time domain, and $N_{RB}$ consecutive subcarriers 510 in the frequency domain. Therefore, one RB 508 includes $N_{symb} \times N_{RB}$ REs 512. In general, the minimum transmission unit of data is the RB. In the NR system, generally, $N_{symb}=14$ and $N_{RB}=12$, and $N_{BW}$ and $N_{RB}$ are proportional to the bandwidth of a system transmission band. A data rate may increase in proportion to the number of RBs that are scheduled to the terminal. In the NR system, in the case of a frequency division duplex (FDD) system in which a downlink and an uplink are distinguished according to frequency, a downlink transmission bandwidth and an uplink transmission bandwidth may be different from each other. A channel bandwidth indicates a radio frequency (RF) bandwidth corresponding to a system transmission bandwidth. Table 1 indicates some of relationships among a system transmission bandwidth, subcarrier spacing (SCS), and a channel bandwidth, defined in an NR system in the frequency band of 6 GHz or lower. Table 2 indicates some of relationships among a system transmission bandwidth, subcarrier spacing (SCS), and a channel bandwidth, defined in an NR system in the frequency band of 6 GHz or higher. For example, in an NR system having a 100 MHz channel bandwidth with 30 kHz subcarrier spacing, a transmission bandwidth includes 273 RBs. In Table 1 and Table 2, "N/A" may be a combination of a bandwidth and a subcarrier not supported in the NR system.

may be determined according to each format. For example, DCI format 1-1, which is scheduling control information on the downlink data, may include at least one of items shown in Table 3 below.

TABLE 3

| Item | Description |
|---|---|
| Carrier indicator | This indicates the frequency carrier on which data is transmitted. |
| DCI format indicator | This is an indicator for indicating whether the DCI is for a downlink or an uplink. |
| Bandwidth part (BWP) indicator | This indicates BWP data from which transmission commences. |
| Frequency-domain resource assignment | This indicates an RB of a frequency domain assigned for data transmission. A resource to be expressed is determined according to a system bandwidth and a resource assignment method. |
| Time-domain resource assignment | This indicates in which OFDM symbol of which slot a data-related channel is to be transmitted. |
| VRB-to-PRB mapping | This indicates how to map a virtual RB (VRB) index and a physical RB (PRB) index. |
| Modulation and coding scheme (MCS) | This indicates a modulation scheme and a coding rate used in data transmission. In other words, a coding rate value for indicating a transport block size (TBS) and channel coding information may be indicated together with information on whether the modulation scheme is quadrature phase shift keying (QPSK), 16 quadrature amplitude modulation (16QAM), 64QAM, or 256QAM. |
| Code block group (CBG) transmission information | This indicates information on which CBG is transmitted when CBG retransmission is configured. |
| HARQ process number | This indicates a process number of HARQ. |
| New data indicator (NDI) | This indicates whether HARQ is initial transmission or retransmission. |
| Redundancy version (RV) | This indicates a redundancy version of HARQ. |
| Transmission power control (TPC) command for physical uplink control channel (PUCCH) | This indicates a transmission power control command for a PUCCH, which is an uplink control channel. |

TABLE 1

| Channel bandwidth [MHz] | SCS | 5 | 10 | 20 | 50 | 80 | 100 |
|---|---|---|---|---|---|---|---|
| $N_{RB}$ constituting transmission bandwidth | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth [MHz] | SCS | 50 | 100 | 200 | 400 |
|---|---|---|---|---|---|
| $N_{RB}$ constituting transmission bandwidth | 60 kHz | 66 | 132 | 264 | N/A |
| | 120 kHz | 32 | 66 | 132 | 264 |

In the NR system, scheduling information on downlink data or uplink data is transmitted from a base station to a terminal via downlink control information (DCI). The DCI may be defined in various formats, and whether the DCI is an uplink grant that is scheduling information on uplink data or a downlink grant that is scheduling information on downlink data, whether the DCI is compact DCI, the control information of which has a small size, whether spatial multiplexing using a multiplexing antenna is applied, whether the DCI is DCI for controlling power, and the like In Table 3, in the case of PDSCH transmission, the time-domain resource assignment may be expressed by information on a slot in which a PUSCH is transmitted, a start symbol position S in the corresponding slot, and the number L of symbols to which the PDSCH is mapped. Here, S may indicate a relative position from the start of the slot, L may indicate the number of consecutive symbols, and S and L may be determined by a start and length indicator value (SLIV) defined as shown in Table 4 below.

TABLE 4 if $(L-1) \leq 7$ then
   SLIV=14·(L−1)+S
else
   SLIV=14·(14−L+11)+(14−1−S)
where $0 < L \leq 14-S$ In the NR system, in general, information on relationships among a SLIV, PDSCH or physical uplink shared channel (PUSCH) mapping type and information on a slot in which the PDSCH or PUSCH is transmitted may be configured in one row via RRC configuration. Then, the base station may transmit the SLIV value, the PDSCH or PUSCH mapping type, and the information on the slot in which the PDSCH or PUSCH is transmitted to the terminal by indicating an index value defined in the configured corresponding relationship, using the time-domain resource assignment of the DCI.

In the NR system, a PDSCH or PUSCH mapping type is defined as type A and type B. In the case of PDSCH or PUSCH mapping type A, a demodulation reference signal (DMRS) symbol starts from a second or third OFDM symbol in a slot. In the case of PDSCH or PUSCH mapping type B, the DMRS symbol starts from a first OFDM symbol in the time-domain resource assigned via PUSCH transmission.

The DCI may be transmitted via a physical downlink control channel (PDCCH), which is a downlink control channel, after going through channel coding and modulation. The PDCCH may be used to refer to control information itself, not to a channel. In general, the DCI is scrambled to a specific radio network temporary identifier (RNTI) or a terminal identifier independently for each terminal, and is configured and transmitted as an independent PDCCH after cyclic redundancy check (CRC) addition and channel coding. The PDCCH is mapped to a control resource set (CORESET) configured for the terminal.

The downlink data may be transmitted via a PDSCH, which is a physical channel for downlink data transmission. The PDSCH may be transmitted after a control channel transmission interval, and scheduling information, such as a particular mapping position in a frequency domain and a modulation scheme, is indicated by the DCI transmitted via the PDCCH. Among the control information configuring the DCI, the base station notifies, via a MCS, the terminal of the size of data (e.g., a transport block size (TBS)) to be transmitted and the modulation scheme applied to the PDSCH to be transmitted. In an embodiment of the disclosure, the MCS may include 5 bits, or more or less than 5 bits. The TBS corresponds to a size before channel coding for error correction is applied to a transport block (TB), which is data to be transmitted by the base station.

In the disclosure, the TB may include a medium access control (MAC) header, a MAC control element (CE), one or more MAC service data units (SDUs), and padding bits. Alternatively, the TB may indicate a unit of data or a MAC protocol data unit (PDU) transmitted from a MAC layer to a physical layer.

The modulation schemes supported in the NR system are quadrature phase shift keying (QPSK), 16 quadrature amplitude modulation (QAM), 64QAM, and 256QAM, wherein modulation orders (Qm) thereof may correspond to 2, 4, 6, and 8, respectively. In other words, 2 bits per symbol for QPSK modulation, 4 bits per symbol for 16QAM, and 6 bits per symbol for 64QAM, 8 bits per symbol for 256QAM, and 10 bits per symbol for 1024 QAM may be transmitted.

Figure 6A:
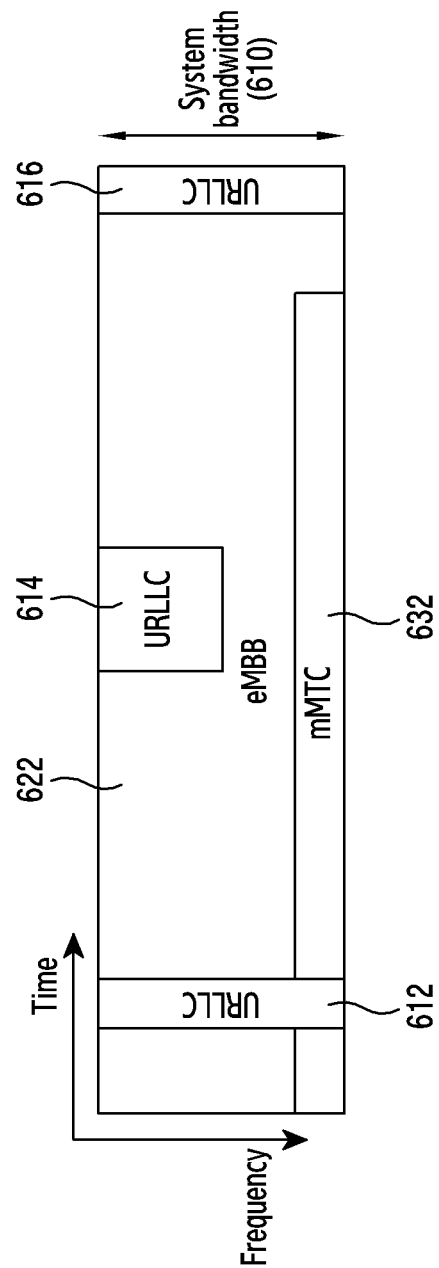
FIG. 6A illustrates an operation of assigning data according to a service to a frequency-time resource in a wireless communication system according to an embodiment of the disclosure.
Figure 6B:
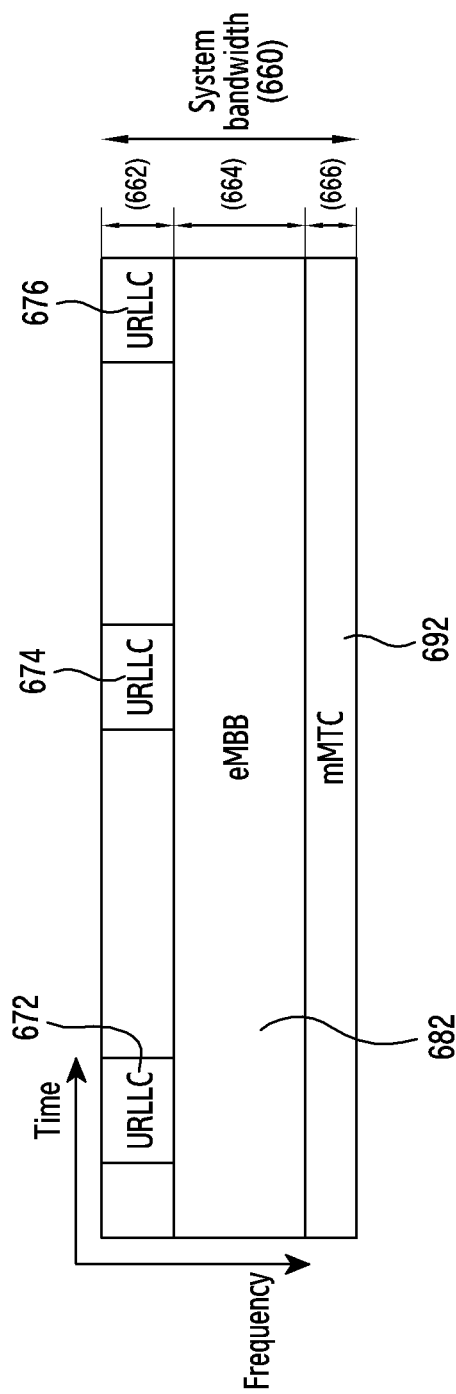
FIG. 6B illustrates an operation of assigning data according to a service to a frequency-time resource in a wireless communication system according to an embodiment of the disclosure.

In terms of service, the NR system is designed to allow various services to be freely multiplexed in time and frequency resources, and accordingly, waveform/numerology, a reference signal, and the like may be dynamically or freely adjusted as required. In order to provide optimal service to the terminal in wireless communication, optimization of data transmission by measuring channel quality and the amount of interference is important. Therefore, accurate channel state measurement is essential. However, unlike 4G communication, in which channel and interference characteristics do not significantly change according to a frequency resource, in the case of a 5G channel, channel and interference characteristics significantly change according to a service, and thus support of a subset at the level of a frequency resource group (FRG) capable of dividing and measuring the channel and interference characteristics is required. Meanwhile, a type of service supported in the NR system may be divided into services including enhanced mobile broadband (eMBB), massive machine-type communications (mMTC), and ultra-reliable and low-latency communication (URLLC). The eMBB is a service targeting high-speed data transmission of voluminous data, the mMTC is a service targeting terminal power minimization and access to multiple terminals, and the URLLC is a service targeting high reliability and low latency. Different requirements may be applied depending on the type of service applied to the terminal. An example of resource distribution for each service is as shown in FIGS. 6A and 6B below. Referring to FIGS. 6A and 6B below, a method of assigning a frequency and a time resource in each system for information transmission is identified.

FIG. 6A illustrates an operation of assigning data according to a service to a frequency-time resource in a wireless communication system according to an embodiment of the disclosure, and FIG. 6B illustrates an operation of assigning data according to a service to a frequency-time resource in a wireless communication system according to an embodiment of the disclosure.

Referring to FIG. 6A, resources are assigned for eMBB 622, URLLCs 612, 614, and 616, and mMTC 632 in an entire system frequency bandwidth 610. When URLLC data 612, 614, and 616 is generated while eMBB data 622 and mMTC data 632 are assigned to a specific frequency band and transmitted, an area to which the eMBB 622 and the mMTC 632 are already assigned may be emptied or the eMBB 622 and the mMTC 632 may be not be transmitted, and URLLC data 612, 614, and 616 may be transmitted. Since the URLLC requires reduction of a delay time, a resource for transmitting the URLLC data 612, 614, and 616 may be assigned to a part of a resource to which the eMBB 622 is assigned. When the URLLC 612, 614, and 616 is additionally assigned to a resource, to which the eMBB 622 is assigned, and transmitted, the eMBB data 622 may not be transmitted in overlapping time-frequency resources. Accordingly, the transmission performance of the eMBB data 622 may suffer. In other words, in the above case, transmission failure of the eMBB 622 data may occur due to assignment of resources for the URLLC 612, 614, and 616. The method as shown in FIG. 6A may be referred to as a "preemption" method.

FIG. 6B illustrates another example of assigning data according to a service to a frequency-time resource in a wireless communication system according to various embodiments. FIG. 6B illustrates an example of providing each service in each of sub-bands 662, 664, and 666 obtained by dividing an entire system frequency band 660. Specifically, a sub-band 662 is used for transmitting URLLC data 672, 674, and 676, a sub-band 664 is used for transmitting eMBB data 682, and a sub-band 666 is used for transmitting mMTC data 692. Information relating to configuration of sub-bands 662, 664, and 666 may be predetermined, and the information may be transmitted from a base station to a terminal via higher-layer signaling. Alternatively, the base station or a network node may arbitrarily divide information relating to sub-bands 662, 664, and 666 and provide services without separately transmitting sub-band configuration information to the terminal.

In various embodiments of the disclosure, the length of a transmission time interval (TTI) used for URLLC transmission may be shorter than the length of a TTI used for eMBB or mMTC transmission. Further, a response to information relating to the URLLC may be transmitted faster than in the case of the eMBB or mMTC, and accordingly, the terminal using URLLC service may transmit or receive information with low latency. Structures of a physical layer channel, which are used for respective types to transmit the above three types of services or data, may differ from each other. For example, at least one of the length of a TTI, an assignment unit of a frequency resource, a structure of a control channel, and a method of mapping data may differ from one another.

Three types of services and three types of data have been described, but there may be more types of services and data corresponding to the services, and in this case, various embodiments to be described below may also be applied thereto.

Figure 7:
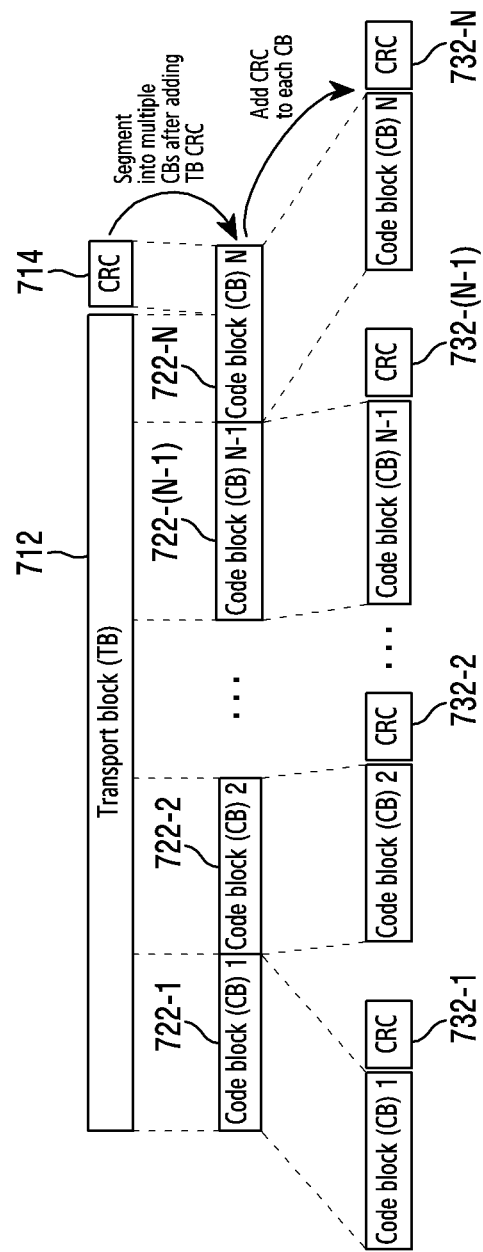
FIG. 7 illustrates a method of encoding data in a wireless communication system according to an embodiment of the disclosure.

FIG. 7 illustrates a method of encoding data in a wireless communication system according to an embodiment of the disclosure. FIG. 7 illustrates an example in which one TB is segmented into multiple codeblocks (CBs), and CRC is added thereto.

Referring to FIG. 7, the CRC 714 may be added at the front or back of one TB 712 to be transmitted in an uplink or a downlink. The CRC 714 may have 16 bits, 24 bits, or a previously set number of bits, or may have a bit number variable depending on a channel state, and may be used for determining whether channel coding is successful in a receiver. The TB 712 and a block to which the CRC 714 is added are divided into a plurality of CBs 722-1, 722-2, 722-(N−1), and 722-N. The TB 712 and a block to which the CRC 714 is added may be divided into CBs having pre-defined sizes, in which case the last CB 722-N may be configured to have a size smaller than the other CBs, or to have the same length as the other CBs by appending 0s, a random value, or is thereto. CRCs 732-1, 732-2, 732-(N−1), and 732-N may be added to the segmented CBs, respectively. Each of the CRCs 732-1, 732-2, 732-(N−1), and 732-N may have 16 bits, 24 bits, or a previously set number of bits, and may be used for determining whether channel coding is successful in a receiver.

In order to generate the CRC 714, the TB 712 and a cyclic generator polynomial may be used. The cyclic generator polynomial may be defined in various ways. For example, when the cyclic generator polynomial for a 24-bit CRC is $g_{CRC24A}(D) = D^{24}+D^{23}+D^{18}+D^{17}+D^{14}+D^{11}+D^{10}+D^{7}\pm D^{6}\pm D^{5}\pm D^{4}\pm D^{3}+D++1$, and L=24, CRC $p_1, p_2, \ldots, p_{L-1}$ may be determined to be a value obtained by dividing $a_0 D^{A+23}+a_1 D^{A+22}+ \ldots +a_{A-1}D^{24}+p_1 D^{23}+p_1 D^{22}+ \ldots +p_{22}D^1+p_{23}$ by $g_{CRC24A}(D)$ with a remainder of 0 with respect to TB data $a_0, a_1, a_2, a_3, \ldots, a_{A-1}$. In the above-described example, although the CRC length L is described to be 24, the length L may be variously defined as 12, 16, 24, 32, 40, 48, 64, and the like.

As described above, after adding the CRC to the TB, the sum of TB and CRC is divided into N number of CBs 722-1, 722-2, 722-(N−1), and 722-N. The CRCs 732-1, 732-2, 732-(N−1), and 732-N are added to CBs 722-1, 722-2, 722-(N−1), 722-N, respectively. The CRC added to each CB may be generated based on a CRC having a length different from that of the CRC added to the TB, or on a different cyclic generator polynomial from that used when generating the CRC added to the TB. However, according to another embodiment of the disclosure, the CRC 714 added to the TB and the CRCs 732-1, 732-2, 732-(N−1), and 732-N added to CBs 722-1, 722-2, 722-(N−1), and 722-N may be omitted according to the type of channel code to be applied to a CB. For example, when a low-density parity check (LDPC) code is applied to a CB instead of a turbo code, the CRCs 732-1, 732-2, 732-(N−1), and 732-N, which are added to CBs, respectively, may be omitted. However, even when the LDPC code is applied, the CRCs 732-1, 732-2, 732-(N−1), and 732-N may be added to the CBs 722-1, 722-2, 722-(N−1), and 722-N. Further, when a polar code is used, the CRC may be also added or omitted.

Referring to FIG. 7, in a TB, the maximum length of one CB is determined based on a type of channel coding to be applied, and a TB and a CRC added to the TB are segmented into CBs according to the maximum length of the CB. In an LTE system of the related art, a CRC for a CB is added to the segmented CB, a data bit of the CB and the CRC are encoded into a channel code to determine coded bits, and, for each of the coded bits, the number of bits to be rate-matched is determined as agreed upon in advance.

Figure 8:
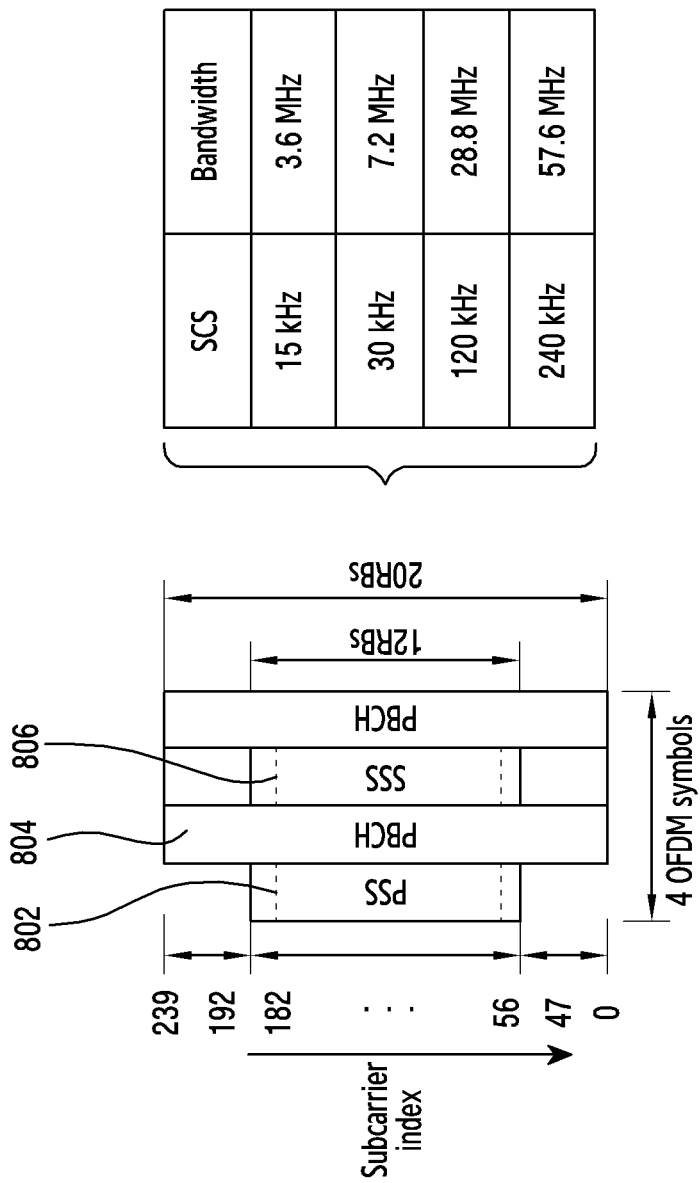
FIG. 8 illustrates mapping of a synchronization signal and a broadcast channel in a wireless communication system according to an embodiment of the disclosure.

FIG. 8 illustrates mapping of a synchronization signal and a broadcast channel in a wireless communication system according to an embodiment of the disclosure. FIG. 8 illustrates an example of a result of mapping of synchronization signals and a physical broadcast channel (PBCH) to a frequency and time domain in a 3GPP NR system.

Referring to FIG. 8, a primary synchronization signal (PSS) 802, a secondary synchronization signal (SSS) 806, and a PBCH 804 are mapped over 4 OFDM symbols, the PSS 802 and the SSS 806 are mapped to 12 RBs, and the PBCH 804 is mapped to 20 RBs. FIG. 8 illustrates frequency bandwidths of 20 RBs according to subcarrier spacing (SCS). A set of the PSS 802, the SSS 806, and the PBCH 804, or a resource area for transmitting the PSS 802, the SSS 806, and the PBCH 804 may be referred to as a SS/PBCH block (SS block, or SSB).

Figure 9:
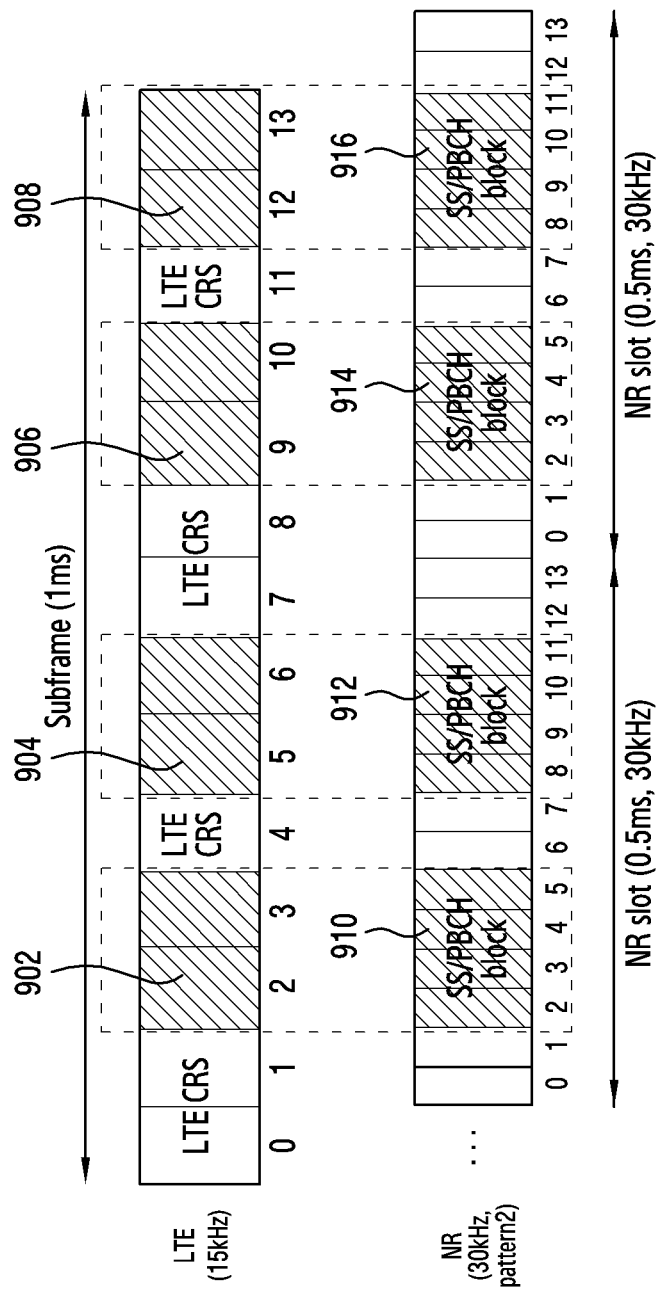
FIG. 9 illustrates an operation of allocating a synchronization signal/physical broadcast channel block (SSB) in a wireless communication system according to an embodiment of the disclosure.

FIG. 9 illustrates an operation of allocating a SSB in a wireless communication system according to an embodiment of the disclosure. FIG. 9 is an example of illustrating to which symbols one SSB is mapped in a slot, and illustrates an LTE system employing 15 kHz subcarrier spacing and an NR system employing 30 kHz subcarrier spacing.

Referring to FIG. 9, SSBs 910, 912, 914, and 916 in the NR system are transmitted at positions 902, 904, 906, and 908 in which the SSBs do not overlap cell-specific reference signals (CRSs) that are always transmitted in the LTE system. The design as shown in FIG. 9 may be for allowing the LTE system and the NR system to coexist in one frequency band.

Figure 10A:
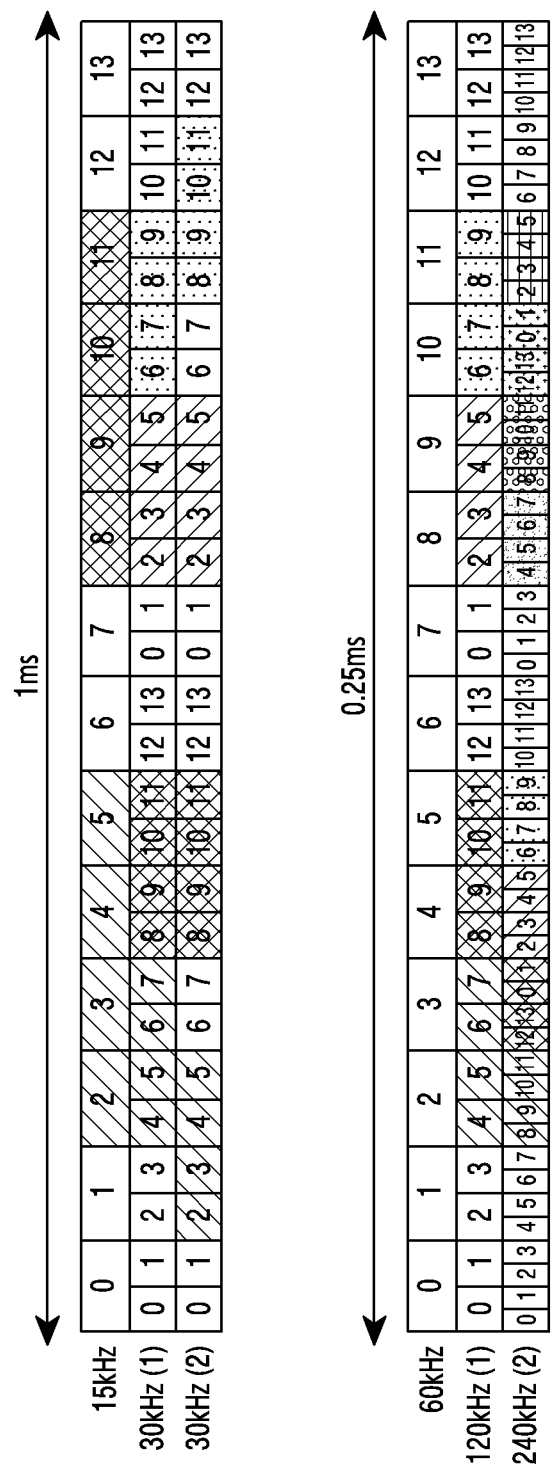
FIG. 10A illustrates symbol positions in which an SSB is transmittable according to subcarrier spacing in a wireless communication system according to an embodiment of the disclosure.
Figure 10B:
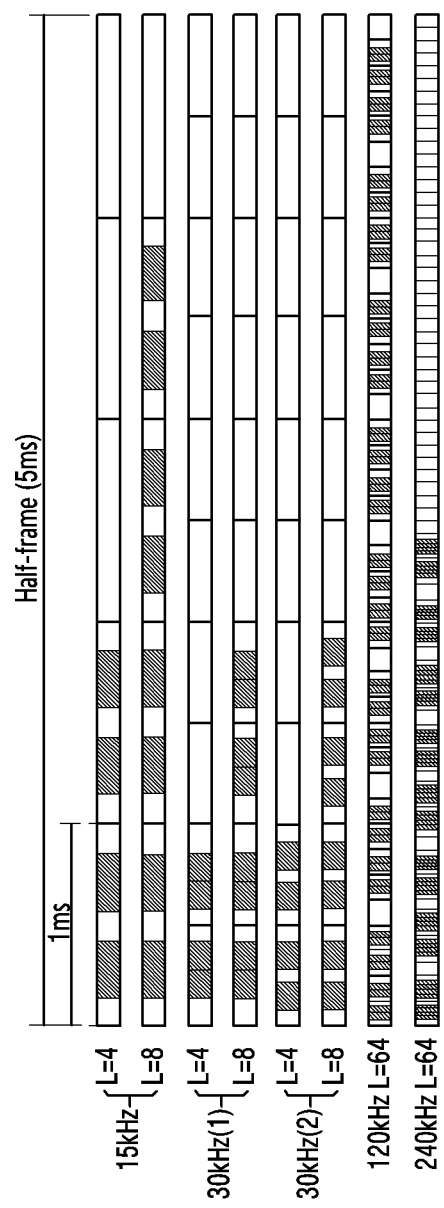
FIG. 10B illustrates symbol positions in which an SSB is transmittable according to subcarrier spacing in a wireless communication system according to an embodiment of the disclosure.

FIG. 10A illustrates symbol positions in which an SSB is transmittable according to subcarrier spacing in a wireless communication system according to an embodiment of the disclosure, and FIG. 10B illustrates symbol positions in which an SSB is transmittable according to subcarrier spacing in a wireless communication system according to an embodiment of the disclosure. FIG. 10A illustrates symbol positions in which an SSB is transmittable at an interval of 1 ms, and FIG. 10B illustrates symbol positions in which an SSB is transmittable at an interval of 5 ms. In an area in which an SSB is transmittable, as shown in FIGS. 10A and 10B, the SSB is not always to be transmitted, and the SSB may or may not be transmitted depending upon the selection of a base station.

In a wireless communication system according to various embodiments of the disclosure, the size of the TB may be calculated through the following stages.

Stage 1: $N'_{RE}$, which is the number of REs assigned to the PDSCH mapping in one PRB in the allocated resource, is calculated. $N'_{RE}$ may be calculated according to $N'_{RE} = N_{sc}^{RB} \cdot N_{symb}^{sh} - N_{DMRS}^{PRB} - N_{oh}^{PRB}$. Here, $N_{sc}^{RB}$ indicates the number (e.g., 12) of subcarriers included in one RB, $N_{symb}^{sh}$ indicates the number of OFDM symbols allocated to the PDSCH, $N_{DMRS}^{PRB}$ indicates the number of REs in one PRB, occupied by a demodulation reference signal (DMRS) of the same code-division multiplexing (CDM) group, and $N_{oh}^{PRB}$ indicates the number of REs (e.g., configured to be one of 0, 6, 12, and 18) occupied by overhead in one PRB configured by higher-layer signaling. Later, $N_{RE}$, the total number of REs allocated to the PDSCH may be calculated. $N_{RE}$ may be calculated according to $N_{RE}=\min(156, N'_{RE}) \cdot n_{PRB}$. $n_{PRB}$ indicates the number of PRBs allocated to a terminal.

Stage 2: The number of temporary information bits, $N_{info}$, may be calculated according to $N_{info}=N_{RE} \cdot R \cdot Q_m \cdot v$. Here, R indicates a code rate, Qm indicates a modulation order, and v indicates the number of allocated layers. The code rate and the modulation order may be transmitted based on a predetermined relationship with an MCS field included in control information. If $N_{info} \leq 3824$, the TBS may be calculated according to the following Stage 3. Otherwise, the TBS may be calculated according to the following Stage 4.

Stage 3: $N'_{info}$ may be calculated according to $$N'_{inf\,o} = \max\left(24, 2^n \cdot \left\lfloor \frac{N_{inf\,o}}{2^n} \right\rfloor\right) \text{ and } n = \max(3, \lfloor \log_2(N_{inf\,o}) \rfloor - 6).$$

Subsequently, the TBS may be determined to be the value closest to $N'_{info}$ among values not smaller than $N'_{info}$ in Table 7 below.

TABLE 7

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Stage 4: $N'_{info}$ may be calculated according to $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. Subsequently, the TBS may be determined according to the value of $N'_{info}$ and a pseudo-code as shown in Table 8 below.

TABLE 8

If $R \leq 1/4$
$$TBS = 8 * C * \left\lceil \frac{N'_{info} + 24}{8 * C} \right\rceil - 24, \text{ where } C = \left\lceil \frac{N'_{info} + 24}{3816} \right\rceil$$
else
  if $N_{info}' > 8424$
$$TBS = 8 * C * \left\lceil \frac{N'_{info} + 24}{8 * C} \right\rceil - 24, \text{ where } C = \left\lceil \frac{N'_{info} + 24}{8424} \right\rceil$$
  else
$$TBS = 8 * \left\lceil \frac{N'_{info} + 24}{8} \right\rceil - 24$$
  end if
end if When one CB is input to an LDPC encoder, the CB may be output after parity bits are added thereto. In this case, the size of each of the parity bits may change according to an LDPC base graph. Depending on the rate-matching scheme, all parity bits generated by LPDC coding may be transmittable, or only some thereof may be transmittable. A scheme of processing all parity bits generated by LDPC coding so as to make the same to be transmittable is referred to as "full-buffer rate-matching (FBRM)", and a scheme of limiting the number of transmittable parity bits is referred to as "limited-buffer rate-matching (LBRM)". When resources are allocated for data transmission, the output of the LDPC encoder is input to a circular buffer and a number of bits of the buffer corresponding to the size of the allocated resources are repeatedly transmitted.

When the length of the circular buffer is indicated by $N_{cb}$, and the number of all parity bits generated by LDPC coding is indicated by N, in the case of the FBRM scheme, $N_{cb}=N$. In the case of the LBRM scheme, $N_{cb}$ may be determined according to $N_{cb}=\min(N, N_{ref})$, where $$N_{ref} = \left\lfloor \frac{TBS_{LBRM}}{CR_{LBRM}} \right\rfloor$$

and $R_{LBRM}=2/3$. The above-described method of determining a TBS may be used to determine $TBS_{LBRM}$. Here, C indicates the actual number of code blocks of a TB being scheduled. The number of layers may be assumed to be the maximum layer number supported by the terminal in the corresponding cell. A modulation order may be assumed to be the maximum modulation order configured in the terminal in the corresponding cell, or to be 64-QAM when no maximum modulation order is configured. A code rate may be assumed to be 948/1024, which is the maximum code rate. $N_{RE}$ may be assumed to be $N_{RE}=156 \cdot n_{PRB}$. $n_{PRB}$ may be assumed to be $n_{PRB}=n_{PRB,LBRM}$. $n_{PRB,LBRM}$ may be defined as shown in Table 9 below.

TABLE 9

| Maximum number of PRBs across all configured BWPs of a carrier | $n_{PRB, LBRM}$ |
|---|---|
| Less tan 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In a wireless communication system according to various embodiments of the disclosure, the maximum data rate supported by a terminal may be determined according to Equation 1 below.

$$\text{data rate (in } Mbps\text{)} = 10^{-6} \cdot \sum_{j=1}^{J\Sigma} \left( v_{Layers}^{(j)} \cdot Q_m^{(j)} \cdot f^{(j)} \cdot R \frac{N_{PRB}^{BW(j),\mu} \cdot 12}{T_s^{\mu}} (1 - OH^{(j)})_{max} O \right) \quad \text{Equation 1}$$

In Equation 1, J indicates the number of carriers grouped by carrier aggregation (CA), $R_{max}=948/1024$, $v_{Layers}^{(j)}$ cates the maximum layer number of a carrier of index j, $Q_m^{(j)}$ indicates the maximum modulation order of a carrier of index j, $f^{(j)}$ indicates a scaling factor of a carrier of index j, and $\mu$ indicates subcarrier spacing. $f^{(j)}$ has a value among 1, 0.8, 0.75, and 0.4 and may be reported by a terminal. $\mu$ may be given as shown in Table 10 below.

TABLE 10

| $\mu$ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, $T_s^{\mu}$ indicates the average length of OFDM symbols, and may be calculated according to $$T_s^{\mu} = \frac{10^{-3}}{14 \cdot 2^{\mu}} \cdot N_{PRB}^{BW(j),\mu}$$

indicates the maximum number of RBs in $BW^{(j)}$. $OH^{(j)}$ indicates an overhead value, and may be given by 0.14 in a downlink and 0.18 in an uplink of FR1 (e.g., a band of 6 GHz or 7.125 GHz or less), and may be given by 0.08 in a downlink and 0.10 in an uplink of FR2 (e.g., a band of 6 GHz or 7.125 GHz or higher). According to Equation 1, the maximum data rate in a downlink in a cell having a 100 MHz frequency bandwidth in 30 kHz subcarrier spacing may be calculated as shown in Table 11 below.

TABLE 11

| $f^{(j)}$ | $v_{Layers}^{(j)}$ | $Q_m^{(j)}$ | Rmax | $N_{PRB}^{SW(j),\mu}$ | $T_s^{\mu}$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

Meanwhile, the actual data rate that can be measured in actual data transmission may be a value acquired by dividing the amount of data by the data transmission time. This may be a value acquired by dividing a TB size (TBS) in 1 TB transmission or a sum of TBSs in 2 TB transmissions by the length of a TTI. For example, the maximum actual data rate in a downlink in a cell having a 100 MHz frequency bandwidth in 30 kHz subcarrier spacing may be determined according to the allocated number of PDSCH symbols as shown in Table 12 below.

TABLE 12

| $N_{symb}^{sh}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

In Table 11, the maximum data rate supported by a terminal may be identified, and in Table 12, the actual data rate according to the allocated TBS may be identified. Here, in some cases, the actual data rate may be larger than the maximum data rate according to scheduling information.

In a wireless communication system, especially in a NR system, a data rate supportable by a terminal may be agreed upon between a base station and a terminal. The data rate may be calculated using the maximum frequency band, the maximum modulation order, the maximum layer number, which are supported by the terminal, and the like. However, the calculated data rate may be different from a value calculated by a transport block size (TBS) and a transmission time interval (TTI) used in actual data transmission. Accordingly, a TBS larger than a value corresponding to a data rate supported by a terminal may be allocated to the terminal. To prevent this, there may be a limit on a TBS capable of being scheduled, based on the data rate supported by a terminal. There may be a need to minimize the incidence of such a case and to define the operation of a terminal in such a case. Further, when LBRM is applied in a communication system defined in current NR systems, $TBS_{LBRM}$ is determined based on the number or rank of layers supported by a terminal. However, processing thereof is inefficient, or parameter configuration thereof is ambiguous, which leads to a problem in that it is difficult to stably apply LBRM in a base station or a terminal. Hereinafter, in the disclosure, various embodiments will be described in order to address the issue.

Figure 11:
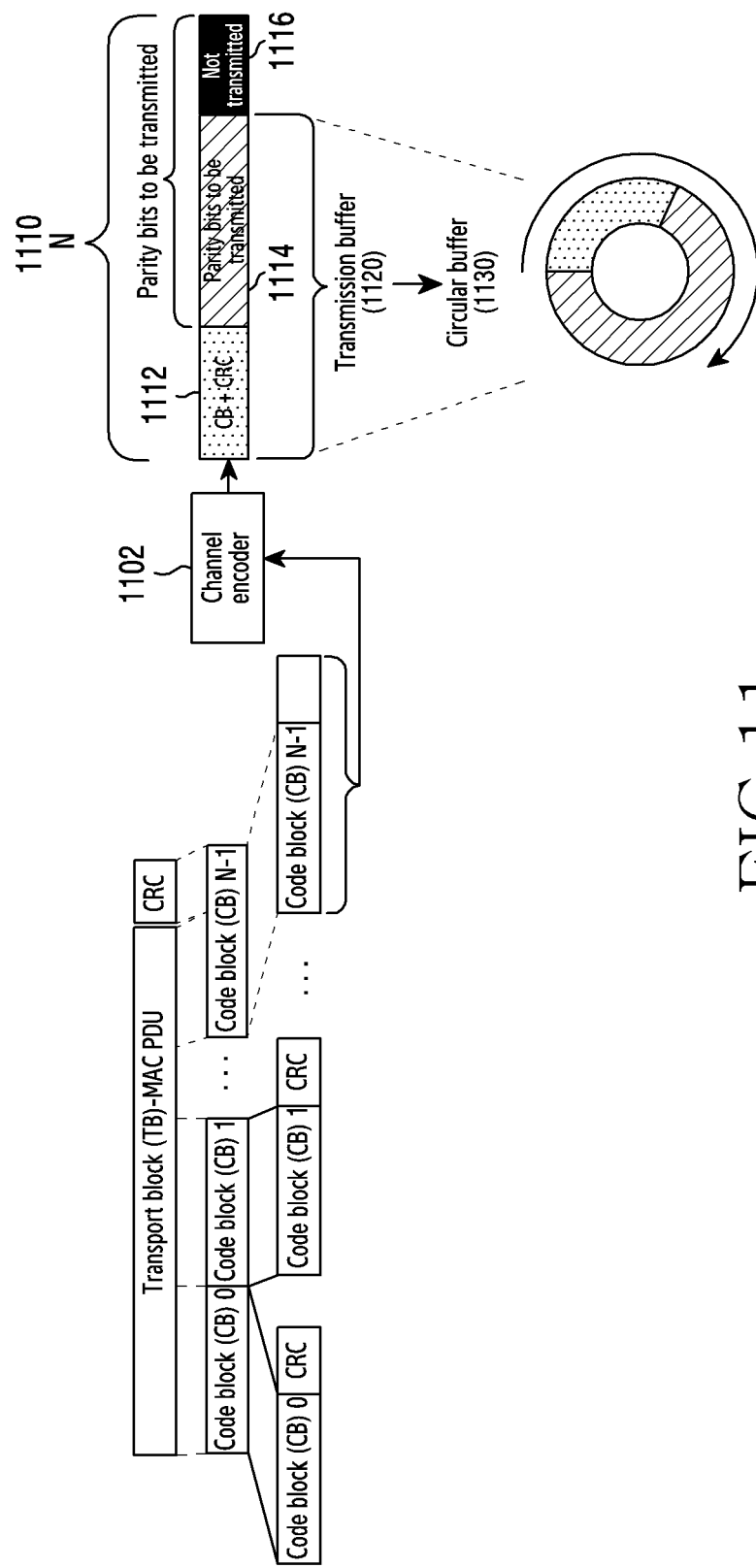
FIG. 11 illustrates an operation of generation and transmission of parity bits in a wireless communication system according to an embodiment of the disclosure.

FIG. 11 illustrates an operation of generation and transmission of parity bits in a wireless communication system according to an embodiment of the disclosure. FIG. 11 is an operation of a process of dividing data to be transmitted into code blocks (CBs), applying channel coding to the divided CBs, generating parity bits, determining parity bits to be transmitted, and transmitting the parity bits.

Referring to FIG. 11, one CB is transmitted to a channel encoder 1102, and data bits 1112 and parity bits 1114 and 1116 are generated by the channel encoder 1102. For example, the channel encoder 1102 may perform encoding using an LDPC code, a polar code, or another channel code.

In this case, the generated amount of parity bits may change according to the details and the type of channel code. If the total length of bits 1110 generated by encoding of the channel encoder 1102 is N bits, in the case in which all parity bits 1114 and 1116 are transmitted, a soft buffer and a memory for storing reception information of the N bits may be needed in a receiver. If the receiver uses a soft buffer having a size smaller than N bits, the reception performance of the receiver may deteriorate.

In order to reduce the required size of the soft buffer, a method of determining parity bits 1116 which are not to be transmitted and of not transmitting the determined parity bits 1116 may be used. For example, only data bits 1112 and a part 1114 of the parity bits are input to a transmit buffer 1120 and transmitted after being transferred to a circular buffer (e.g., soft buffer) 1130. In other words, the number of transmittable parity bits may be limited, and the amount to which to limit the same is based on the sum of the size of the data bits 1112 and the size of a part 1114 of the parity bits, and may be referred to as $N_{cb}$. When $N_{cb}$ is N, it means that the transmittable parity bits are not limited, and all parity bits generated by channel coding are capable of being transmitted. As described above, a method of processing all parity bits so as to make the same transmittable may be referred to as "full-buffer rate-matching (FBRM)". Alternatively, the transmittable parity bits may be limited according to a method in which $N_{cb}$ is calculated based on $N_{cb}$=min $(N, N_{ref})$, where $$N_{ref} = \left\lfloor \frac{TBS_{LBRM}}{C \cdot R_{LBRM}} \right\rfloor.$$

As described above, a method of limiting the number of transmittable parity bits is referred to as "limited-buffer rate-matching (LBRM)".

In the following embodiments of the disclosure, a base station is an entity for allocating a resource to a terminal, may be a base station supporting both V2X communication and normal cellular communication, or may be a base station supporting only V2X communication. In other words, the base station may indicate a gNB, an eNB, a road side unit (RSU), or a fixed station. The terminal may be not only a normal UE and a mobile station, but also one of a vehicle supporting vehicle-to-vehicle (V2V) communication, a vehicle or a handset (e.g., a smartphone) of a pedestrian supporting vehicle-to-pedestrian (V2P) communication, a vehicle supporting vehicle-to-network (V2N) communication, or a vehicle supporting vehicle-to-infrastructure (V2I)

communication, and an RSU equipped with a terminal function, an RSU equipped with a base station function, or an RSU equipped with a part of a base station function and a part of a terminal function.

In the V2X environment, data may be transmitted from one terminal to a plurality of terminals, from one terminal to another terminal, or from one base station to a plurality of terminals. However, the disclosure is not limited thereto, and may be applied to various cases.

In order for terminals to perform sidelink transmission or reception, the terminals are operated based on a resource pool pre-defined, configured, or pre-configured between the terminals. The resource pool may be a set of frequency- and time-domain resources which can be used for sidelink signal transmission or reception. For example, sidelink signal transmission or reception are to be performed in frequency-time resources predetermined for transmitting or receiving the sidelink signal. These resources are defined as a resource pool. The resource pool may be used by being defined for each of transmission and reception, or by being commonly defined for both transmission and reception. Further, one resource pool or multiple resource pools may be configured in the terminals so that the terminals may perform sidelink signal transmission or reception. Configuration information relating to a resource pool used for sidelink transmission or reception and other configuration information for sidelink may be preinstalled when the terminal is manufactured, may be configured by the current base station, may be pre-configured by another base station or another network unit before the terminal accesses the current base station, may be a fixed value, may be provisioned from a network, or may be independently self-constructed.

In order to indicate a frequency-domain resource of a resource pool, a base station may indicate a start index and the length of a PRB (e.g., the number of PRBs) belonging to a resource pool, but is not limited thereto, and may configure one resource pool by indicating PRBs using a bitmap. Further, in order to indicate a time-domain resource of a resource pool, the base station may indicate, in units of bitmaps, indices of an OFDM symbol or a slot belonging to a resource pool. Alternatively, in another method, a system may use a formula in a set for particular slots and define slots satisfying the formula so that the slots belong to a corresponding resource pool. In configuring a time-domain resource, for example, a base station may indicate which slots among slots during a particular time belong to a particular resource pool, by using the bitmap. In this case, at every particular time, whether the slot belongs to the resource pool of a time resource may be indicated according to the bitmap.

Meanwhile, a sub-channel may be defined in units of frequency resources including multiple RBs. In other words, the sub-channel may be defined as an integer multiple of an RB. The size of the sub-channel may be configured the same for all sub-channels or differently for respective sub-channels. In general, consecutive PRBs constitute one sub-channel, but there is no restriction that consecutive PRBs always constitute one sub-channel. The sub-channel may be a basic unit for resource allocation for a physical sidelink shared channel (PSSCH) or a physical sidelink control channel (PSCCH). Accordingly, the size of the sub-channel may be configured differently depending on whether the corresponding channel is a PSSCH or a PSCCH. Further, the term "sub-channel" may be interchangeably used with other terms, such as "resource block group (RBG)", "set for RBGs", or "set of PRBs".

For example, "startRBSubchannel" in higher-layer signaling or configuration information may indicate a start position of a sub-channel in a frequency domain in a resource pool. For example, in an LTE V2X system, a resource block, which is a frequency resource belonging to a resource pool for a PSSCH, may be determined according to the method shown in Table 13 below.

TABLE 13

The resource block pool consists of $N_{subCH}$ sub-channels where $N_{subCH}$ is given by higher layer parameter numSubchannel.
The sub-channel m for m = 0, 1, . . . ,
$N_{subCH}-1$ consists of a set of $n_{subCHsize}$
contiguous resource blocks with the physical resource block number
$n_{PRB} = n_{subCHRBstart} + m* n_{subCHsize} + j$ for j = 0, 1, . . . , $N_{subCH} - 1$
where $n_{subCHRBstart}$ and
$n_{subCHsize}$ are given by higher layer parameters startRBSubchannel
and sizeSubchannel, respectively For resource pool configuration, the granularity of resource allocation in the time domain may be a slot. In the disclosure, resource pools are illustrated as slots non-consecutively allocated in the time domain, but resource pools may be consecutively allocated in the time domain, or may be configured in units of symbols.

In another example, when "startSlot" in higher-layer signaling or configuration information indicates a start position of a slot in a time domain in a resource pool, subframes $(t_0^{SL}, t_1^{SL}, \ldots, t_{T_{max}}^{SL}(\ ))$ that are time resources belonging to a resource pool for a PSSCH in an LTE V2X system may be determined according to the method shown in Table 14.

TABLE 14

● $0 \leq t_i^{SL} < 10240$,
● the subframe index is relative to subframe#0 of the radio frame corresponding to SFN 0 of the serving cell or DFN 0 (described in [11]),
● the set includes all the subframes except the following subframes,
 ■ subframes in which SLSS resource is configured,
 ■ downlink subframes and special subframes if the sidelink transmission occurs in a TDD cell,
 ■ reserved subframes which are determined by the following steps:
  1) the remaining subframes excluding $N_{slss}$ and $N_{dssf}$ subframes from the set of all the subframes are denoted by $(l_0, l_1, \ldots, l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.
  2) a subframe $l_r$ $(0 \leq r < (10240 - N_{slss} - N_{dssf}))$ belongs to the reserved subframes if $$r = \left\lfloor \frac{m \cdot (10240 - N_{slss} - N_{dssf})}{N_{reserved}} \right\rfloor$$

where m = 0, . . . , $N_{reserved} - 1$ and $N_{reserved} - 1$ and
$N_{reserved} = (10240 - N_{slss} - N_{dssf})$ mod $L_{bitmap}$. Here, $L_{bitmap}$ the length of the bitmap is configured by higher layers.
● the subframes are arranged in increasing order of subframe index.
● A bitmap $(b_0, b_1, \ldots, b_{L_{bitmap}-1})$ associated with the resource pool is used where $L_{bitmap}$ the length of the bitmap is configured by higher layers.
● A subframe $t_k^{SL}$ $(0 \leq k < (10240 - N_{slss} - N_{dssf} - N_{reserved}))$ belongs to the subframe pool if $b_{k'} = 1$ where k' = k mod $L_{bitmap}$.

According to a process in Table 14, at first, information on which slot is included in a resource pool, among slots (subframes in Table 14) during a particular period, except for at least one slot used for a downlink, is indicated by using a bitmap, and information on which slot belongs to the resource pool among the slots indicated to be included in the resource pool is indicated in bitmap information.

A sidelink control channel may be referred to as a physical sidelink control channel (PSCCH), and a sidelink shared channel or data channel may be referred to as a physical sidelink shared channel (PSSCH). Further, a broadcast channel broadcasted together with a synchronization signal may be referred to as a physical sidelink broadcast channel (PSBCH), and a channel for feedback transmission may be referred to as a physical sidelink feedback channel (PSFCH). However, the PSCCH or the PSSCH may be used for feedback transmission. According to a communication system, the above-described channels may be referred to as LTE-PSCCH, LTE-PSSCH, NR-PSCCH, NR-PSSCH, and the like. In the disclosure, "sidelink" indicates a link between terminals, and "Uu link" indicates a link between a base station and a terminal.

Information transmitted in the sidelink may include sidelink control information (SCI), sidelink feedback control information (SFCI), sidelink channel state information (SCSI), and a sidelink shared channel (SL-SCH) that is a transmission channel.

The above-described information and transmission channel may be mapped to a physical channel as shown in Table 15 and Table 16 below.

TABLE 15

| Transport channel (TrCH) | Physical Channel |
| --- | --- |
| SL-SCH | PSSCH |

TABLE 16

| Control information | Physical Channel |
| --- | --- |
| SCI | PSCCH |
| SFCI | PSFCH |
| SCSI | PSSCH |

Further, when the SCSI is transmitted via the PSFCH, transmission-channel/physical-channel mapping may be applied as shown in Table 17 and Table 18 below.

TABLE 17

| Transport channel (TrCH) | Physical Channel |
| --- | --- |
| SL-SCH | PSSCH |

TABLE 18

| Control information | Physical Channel |
| --- | --- |
| SCI | PSCCH |
| SFCI | PSFCH |
| SCSI | PSSCH, PSFCH |

Further, when the SCSI is transmitted to a higher layer, for example, is transmitted using a MAC CE, this corresponds to a SC-SCH. Accordingly, the SCSI may be transmitted via a PSSCH, and transmission channel-physical channel mapping may be applied as shown in Table 19 and Table 20 below.

TABLE 19

| (Transport channel (TrCH) | Physical Channel |
| --- | --- |
| SL-SCH | PSSCH |

TABLE 20

| Control information | Physical Channel |
| --- | --- |
| SCI | PSCCH |
| SFCI | PSFCH |
| SCSI | PSSCH, PSFCH |

When CSI of sidelink is transmitted via a MAC CE, a reception terminal may also transmit at least one piece of additional information to a transmission terminal.

Information of a slot in which a sidelink CSI-RS used when obtaining CSI is transmitted, that is, information relating to a time at which the sidelink CSI-RS is transmitted Information relating to a frequency domain in which CSI is obtained, that is, information relating to a frequency domain in which a sidelink CSI-RS is transmitted, a sub-channel index, or the like may be included.

Information on a rank indicator (RI) and a channel quality indicator (CQI)

Information of a preferable precoding matrix

Information related to preferable beamforming

ID information of a reception terminal that received a sidelink CSI-RS

ID information of a transmission terminal that transmitted sidelink CSI-RS

Figure 12A:
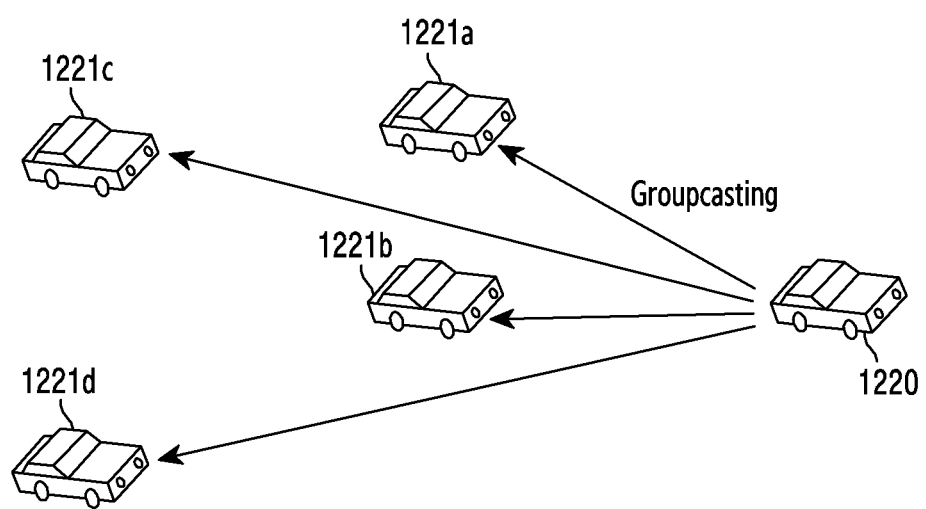
FIG. 12A illustrates an operation of groupcasting transmission in a wireless communication system according to an embodiment of the disclosure.

ID information of a transmission terminal for transmitting sidelink CSI feedback information ID information of a reception terminal for receiving sidelink CSI feedback information FIG. 12A illustrates an operation of groupcasting transmission in a wireless communication system according to an embodiment of the disclosure.

Referring to 12A, a terminal 1220 transmits common data to a plurality of terminals 1221a, 1221b, 1221c, and 1221d, that is, transmits data in a groupcasting manner. The terminal 1220 and each of the terminals 1221a, 1221b, 1221c, and 1221d may be mobile devices, such as vehicles. For the groupcasting, at least one piece of separate control information (e.g., sidelink control information (SCI)), physical control channel (e.g., a physical sidelink control channel (PSCCH)), and data may be further transmitted.

Figure 12B:
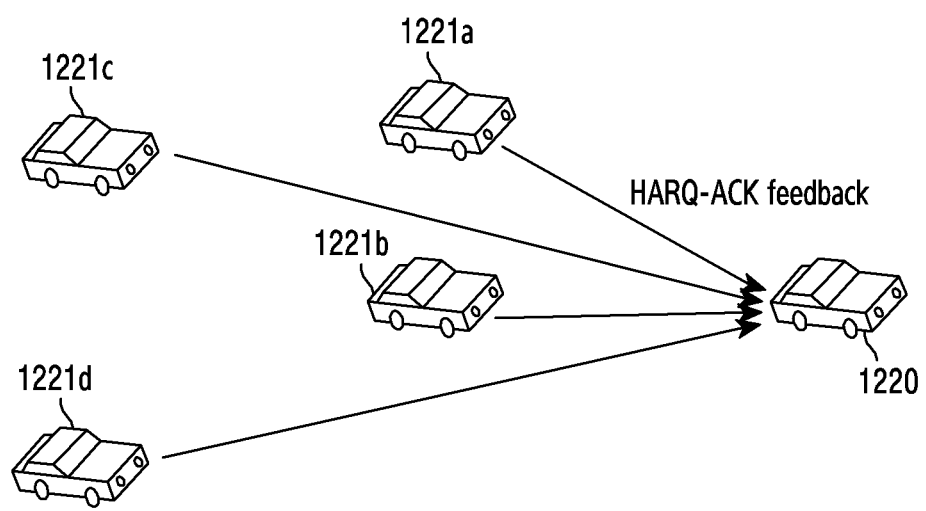
FIG. 12B illustrates an operation of hybrid automatic repeat request (HARQ) feedback transmission according to groupcasting in a wireless communication system according to an embodiment of the disclosure.

FIG. 12B illustrates an operation of HARQ feedback transmission according to groupcasting in a wireless communication system according to an embodiment of the disclosure.

Referring to FIG. 12B, terminals 1221a, 1221b, 1221c, and 1221d, which have received common data by groupcasting, transmit information indicating success or failure of data reception to the terminal 1220 that transmitted the data. The information may include HARQ-ACK feedback. The data transmission and feedback operations shown in FIGS. 12A and 12B are performed based on groupcasting. However, according to another embodiment of the disclosure, the data transmission and feedback operations shown in FIGS. 12A and 12B may be applied to transmission performed in a unicasting manner.

Figure 13:
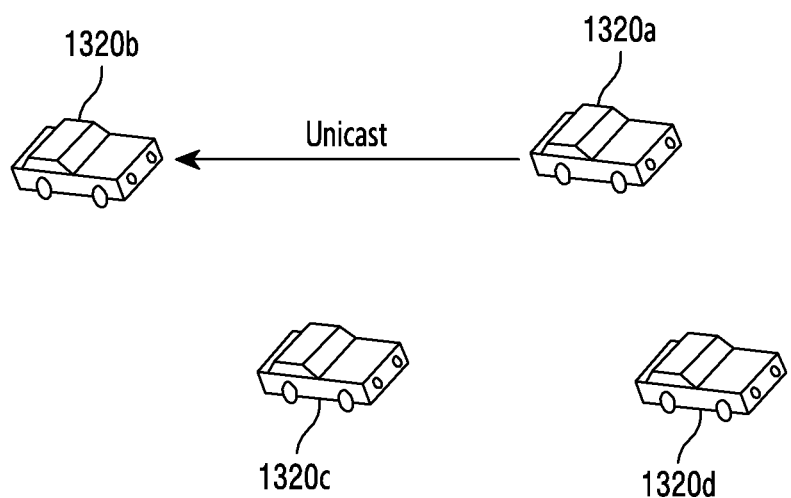
FIG. 13 illustrates an operation of unicast transmission in a wireless communication system according to an embodiment of the disclosure.

FIG. 13 illustrates an operation of unicast transmission in a wireless communication system according to an embodiment of the disclosure.

Referring to FIG. 13, a first terminal 1320a transmits data to a second terminal 1320b. In another example, the direction in which the data is transmitted may be the other way round (e.g., from the second terminal 1320b to the first terminal 1320a). The other terminals 1320c and 1320d except for the first terminal 1320a and the second terminal 1320b may not receive data which is transmitted or received between the first terminal 1320a and the second terminal 1320b in a unicasting manner. In the data transmission or reception between the first terminal 1320a and the second terminal 1320b via the unicasting, data may be mapped to a resource predetermined between the first terminal 1320a and the second terminal 1320b, may be scrambled using a value predetermined therebetween, or may be transmitted using a preconfigured value. Alternatively, control information relating to data transmission or reception between the first terminal 1320a and the second terminal 1320b via the unicasting may be mapped in a manner predetermined therebetween. Alternatively, the data transmission or reception between the first terminal 1320a and the second terminal 1320b via the unicasting may include an operation of mutually identifying a unique ID therebetween. Each of the terminals may be a mobile device, such as a vehicle. For the unicasting, at least one piece of separate control information, a physical control channel, and data may be further transmitted.

Figure 14A:
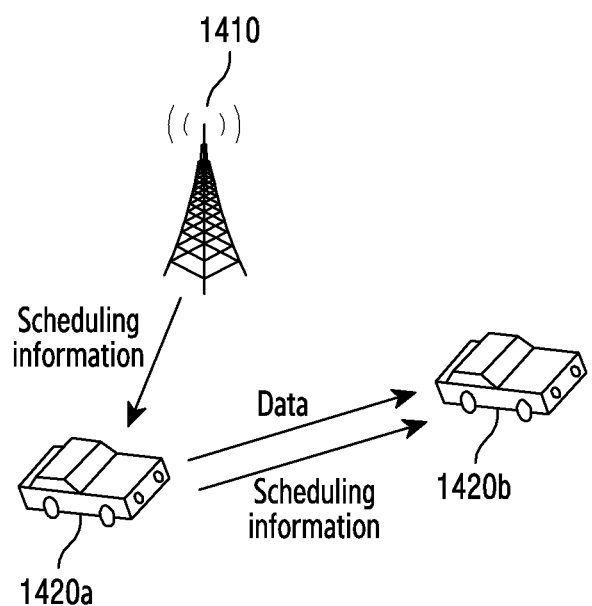
FIG. 14A illustrates an operation of sidelink data transmission according to scheduling of a base station in a wireless communication system according to an embodiment of the disclosure.

FIG. 14A illustrates an operation of sidelink data transmission according to scheduling of a base station in a wireless communication system according to an embodiment of the disclosure. FIG. 14A illustrates mode 1 indicating a method of transmitting sidelink data by a terminal that has received scheduling information from a base station. In the disclosure, the method of performing sidelink communication based on scheduling information is referred to as "mode 1", but may be referred to using other terms.

Referring to FIG. 14A, a terminal 1420a (hereinafter, referred to as a "transmission terminal") for transmitting data in sidelink receives scheduling information for sidelink communication from a base station 1410. The transmission terminal 1420a that received the scheduling information transmits the sidelink data to another terminal 1420b (hereinafter, referred to as a "reception terminal"). The scheduling information for the sidelink communication is included in DCI, and the DCI may include at least one of the following items in Table 21 below.

TABLE 21

| Item | Description |
| --- | --- |
| Carrier Indicator | This may be used for scheduling sidelink of another carrier in the case in which carrier aggregation (CA) is applied. |
| Lowest index of sub-channel assignment for initial transmission | This may be used for frequency resource assignment of initial transmission. |
| Information to be included in sidelink control information | Frequency resource assignment information including information on resource assignment or resource reservation information for initial transmission, retransmission, and subsequent N-th transmission Information on a time interval between initial transmission and retransmission |
| Information on sidelink slot structure | This may include information on which slot and which symbols may be used for sidelink. |
| HARQ-ACK/CSI feedback timing information | This may include timing information for transmitting HARQ-ACK or CSI feedback in sidelink to a base station. |
| Receiver ID | This indicates ID information on terminals which are to perform reception. |

TABLE 21-continued

| Item | Description |
| --- | --- |
| Quality-of-Service (QoS) information such as priority | This indicates information on the priority which data to be transmitted has. |

Scheduling may be performed for one time of sidelink transmission, or may be performed for regular transmission or semi-persistent scheduling (SPS) or configured grant transmission. A scheduling method may be indicated by an indicator included in DCI, or may be indicated by an ID value or an RNTI scrambled to CRC to be added to DCI. DCI for sidelink transmission may further include padding bits (e.g., zeroes), wherein the DCI for sidelink transmission has different sizes from other DCI formats, such as DCI for downlink scheduling or DCI for uplink scheduling.

After receiving DCI for sidelink scheduling from the base station 1410, the transmission terminal 1420a transmits a PSCCH including sidelink scheduling information, and then transmits a PSSCH which is data corresponding thereto. The PSCCH, which is sidelink scheduling information, may include SCI, and the SCI may include at least one of the following items in Table 22 below.

TABLE 22

| Item | Description |
| --- | --- |
| HARQ process number | This indicates an HARQ process ID for HARQ-related operation of data to be transmitted. |
| New data indicator (NDI) | This indicates information on whether currently transmitted data is new data. |
| Redundancy version (RV) | This indicates information on which parity bit is transmitted when data is mapped after channel coding. |
| Layer-1 source ID | This indicates ID information in a physical layer of a transmission terminal. |
| Layer-1 destination ID | This indicates ID information in a physical layer of a reception terminal. |
| Frequency-domain resource assignment for scheduling PSSCH | This indicates frequency-domain resource configuration information of data to be transmitted. |
| MCS | This indicates information on a modulation order and a coding rate. |
| QoS indication | This may include a priority, targeting latency/delay, a targeting distance, a targeting rate, and the like. |
| Antenna port(s) | This indicates antenna port information for data transmission. |
| DMRS sequence initialization | This may include information such an ID value for initialization of a DMRS sequence. |
| PTRS-DMRS association | This may include information on PTRS mapping. |
| CBGTI | This may be utilized as an indicator for CBG-unit retransmission. |
| Resource reservation | This indicates information for a resource reservation. |
| Time gap between initial transmission and retransmission | This indicates time interval information between initial transmission and retransmission. |
| Retransmission index | This indicates an indicator for identifying retransmission. |
| Transmission format/cast type indicator | This indicates an indicator for identifying a transmission format or unicast/groupcast/broadcast. |
| Zone ID | This indicates information on the position of a transmission terminal. |

TABLE 22-continued

| Item | Description |
| --- | --- |
| NACK distance | This is a reference indicator for determining whether a reception terminal is to be transmitted HARQ-ACK or NACK. |
| HARQ feedback indication | This indicates whether HARQ feedback is to be transmitted or is being transmitted. |
| Time-domain resource assignment for scheduling PSSCH | This indicates time-domain resource information of sidelink data to be transmitted. |
| Second SCI indication | This is an indicator including mapping information of second SCI in the case of 2-stage control information. |
| DMRS pattern | This indicates information on a DMRS pattern (for example, the position of a symbol to which a DMRS is mapped). |

Control information including at least one of the above-listed items in Table 22 may be included in one piece of SCI or two pieces of SCI in order to be transmitted to the reception terminal. A method in which the control information is divided into two pieces of SCI may be referred to as "2-stage SCI".

Figure 14B:
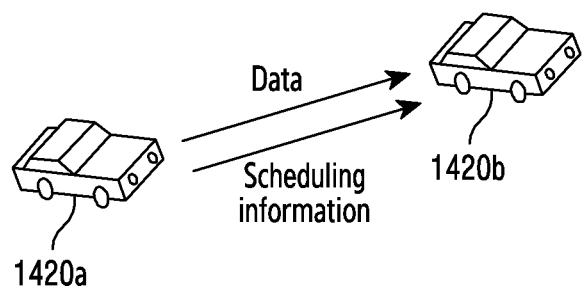
FIG. 14B illustrates an operation of sidelink data transmission without scheduling of a base station in a wireless communication system according to an embodiment of the disclosure.

FIG. 14B illustrates an operation of sidelink data transmission without scheduling of a base station in a wireless communication system according to an embodiment of the disclosure. FIG. 14B illustrates mode 2, indicating a method of transmitting sidelink data by a terminal without receiving scheduling information from a base station. In the disclosure, the method of performing sidelink communication without scheduling information is referred to as "mode 2", but may be referred to using other terms.

Referring to FIG. 14B, a terminal 1420a for transmitting data in sidelink may transmit sidelink scheduling control information and sidelink data to a reception terminal 1420b based on the determination by the terminal 1420a itself, without scheduling on the part of a base station. In this case, for the sidelink scheduling control information, SCI having the same format as that of the SCI used in mode 1 sidelink communication may be used. For example, the scheduling control information may include at least one of the above-listed items in Table 22.

Figure 15:
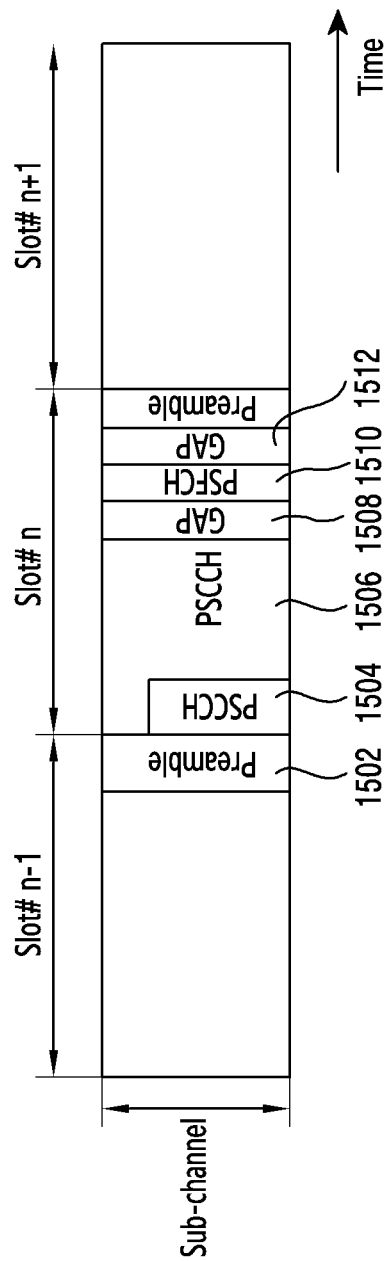
FIG. 15 illustrates an operation of a channel structure of a slot used for sidelink communication in a wireless communication system according to an embodiment of the disclosure.

FIG. 15 illustrates an operation of a channel structure of a slot used for sidelink communication in a wireless communication system according to an embodiment of the disclosure. FIG. 15 illustrates physical channels mapped to a slot for sidelink communication.

Referring to FIG. 15, a preamble 1502 is mapped before the start of a slot, that is, is mapped to the back-end of a previous slot. Then, from the start of the slot, a PSCCH 1504, a PSSCH 1506, a gap 1508, a physical sidelink feedback channel (PSFCH) 1510, and a gap 1512 are mapped.

Before transmitting a signal in the corresponding slot, a transmission terminal transmits the preamble 1502 in one or more symbols. The preamble may be used for correctly performing automatic gain control (AGC) for adjusting amplification strength when a reception terminal amplifies the power of a received signal. Further, the preamble may or may not be transmitted depending on whether a signal is transmitted in a previous slot of a transmission terminal. In other words, when the transmission terminal transmits a signal to the same terminal in a slot (e.g., slot #n−1) preceding the corresponding slot (e.g., slot #n), transmission of the preamble 1502 may be omitted. The preamble 1502 may be referred to as a "synchronization signal", a "sidelink synchronization signal", a "sidelink reference signal", a "midamble", an "initial signal", a "wake-up signal", or other terms having equivalent technical meanings to the above-described terms.

The PSCCH 1504 including control information may be transmitted using symbols transmitted in the beginning of the slot, and the PSSCH 1506 scheduled in control information of the PSCCH 1504 may be transmitted. At least a part of SCI, which is control information, may be mapped to the PSSCH 1504. Then, the gap 1508 exists, and the PSFCH 1510, which is a physical channel for transmitting feedback information, is mapped.

The terminal may be preconfigured to receive the position of a slot in which PSFCH transmission is allowed. The pre-configuration of receiving the position of the slot may be predetermined in the process of producing a terminal, may be transmitted when the terminal accesses a sidelink-related system, may be transmitted from a base station when the terminal accesses to the base station, or may be transmitted from other terminals.

FIG. 15 illustrates that the PSFCH 1510 is positioned at the end of the slot. By securing a gap 1508 indicating a predetermined empty time between the PSSCH 1504 and the PSFCH 1510, the terminal that transmitted or received the PSSCH 1504 may prepare for reception or transmission of the PSFCH 1510 (e.g., transmission/reception switch). After the PSFCH 1510, there is a gap 1512, which is a predetermined empty interval.

Figure 16A:
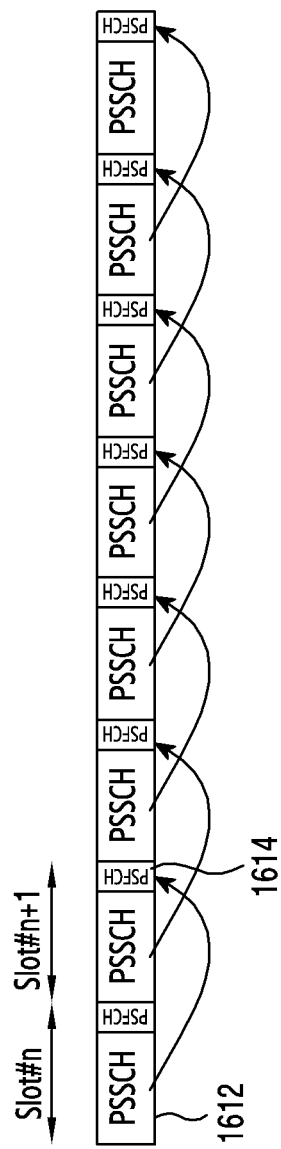
FIG. 16A illustrates a first operation of feedback channel distribution in a wireless communication system according to an embodiment of the disclosure.

FIG. 16A illustrates a first operation of feedback channel distribution in a wireless communication system according to an embodiment of the disclosure. FIG. 16A illustrates the case in which a resource capable of transmitting or receiving a PSFCH is assigned to every slot. In FIG. 16A, an arrow indicates a PSFCH slot from which HARQ-ACK feedback information corresponding to a PSSCH is transmitted.

Referring to FIG. 16A, the HARQ-ACK feedback information on a PSSCH 1612 transmitted in slot #n is transmitted from a PSFCH 1614 of slot #n+1. Since the PSFCH is assigned to every slot, the PSFCHs may correspond to the slots including the PSSCHs, respectively. For example, when configuring the periodicity of a resource capable of transmitting or receiving a PSFCH by a parameter, such as periodicity_PSFCH_resource, in FIG. 16A, periodicity_PSFCH_resource indicates 1 slot. Alternatively, the periodicity may be configured in unit of msec, and may be indicated as a value which is assigned for every slot according to subcarrier spacing.

Figure 16B:
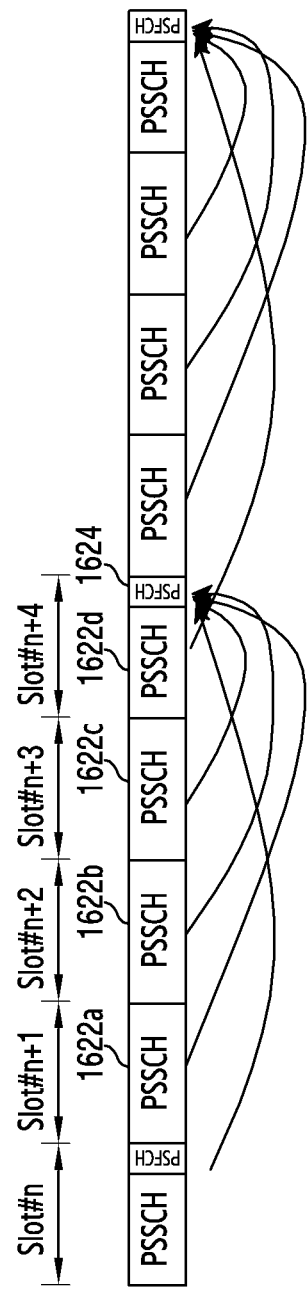
FIG. 16B illustrates a second operation of feedback channel distribution in a wireless communication system according to an embodiment of the disclosure.

FIG. 16B illustrates a second operation of feedback channel distribution in a wireless communication system according to an embodiment of the disclosure. FIG. 16B illustrates the case in which a resource is assigned to transmit or receive a PSFCH in every four slots.

Referring to FIG. 16B, an arrow indicates a PSFCH slot from which HARQ-ACK feedback information corresponding to a PSSCH is transmitted.

Referring to FIG. 16B, a PSFCH is included only in the last of four slots. Similarly, a PSFCH is included only in the last of the next four slots. Accordingly, the HARQ-ACK feedback information on a PSSCH 1622a of slot #n, a PSSCH 1622b of slot #n+1, a PSSCH 1622c of slot #n+2, and a PSSCH 1622d of slot #n+3 is transmitted from a PSFCH 1624 of slot #n+4. Here, an index of a slot may be an index for slots included in a resource pool. For example, the four slots are not actually physically consecutive slots, but may be consecutively enumerated slots among slots included in a resource pool (or a slot pool) used for sidelink communication between terminals. HARQ-ACK feedback information of a PSSCH transmitted in the fourth slot may not be transmitted from a PSFSH of the same slot. This may be because the processing time to be taken for the terminal to finish decoding the PSSCH transmitted in the slot and transmit the PSFCH in the same slot is not short.

When the terminal transmits or receives a PSFCH, the number of HARQ-ACK feedback bits included in the PSFCH is to be identified in order to correctly perform transmission or reception. The number of HARQ-ACK feedback bits included in the PSFCH and the PSSCH of which HARQ-ACK bits are to be included may be determined based on a combination of one or more or two or more of the items listed in Table 23 below.

TABLE 23

| Item |
|---|
| Periodicity of a slot capable of transmitting or receiving a PSFCH by a parameter, such as periodicity_PSFCH_resource |
| Whether HARQ-ACK is bundled. This may be a value acquired by determining, by an AND operation, HARQ-ACK bits of a PSFCH transmitted in a predetermined number of slots before PSFCH transmission or reception (i.e., if any one is NACK, it is determined as NACK). |
| Number of transport blocks (TBs) included in a PSSCH |
| Whether code block group (CBG)-unit retransmission is used or configured |
| Whether HARQ-ACK feedback is activated |
| Number of PSSCHs actually transmitted or received |
| Minimum processing time required for a terminal to process a PSSCH and prepare PSFCH transmission |

When a resource capable of transmitting a PSFCH is configured or given in slot #n+x, the terminal that received the PSSCH in slot #n transmits HARQ-ACK feedback information of the PSSCH by using the PSFCH of slot #n+x, wherein x is the smallest among integers equal to or greater than K. K may be a value preconfigured by a transmission terminal, or may be a value configured in a resource pool from which the PSSCH or the PSFCH is transmitted. In order to configure K, each terminal may exchange information on its capability with the transmission terminal in advance. For example, K may be determined according to at least one of subcarrier spacing, terminal capability, a value configured in the transmission terminal, or the configuration of a resource pool.

Hereinafter, the disclosure describes embodiments for applying LBRM to sidelink communication. In order to apply the LBRM to sidelink communication, it is required to determine parameters necessary for LBRM operation. A terminal performing sidelink communication may determine necessary parameters according to various embodiments below.

Figure 17:
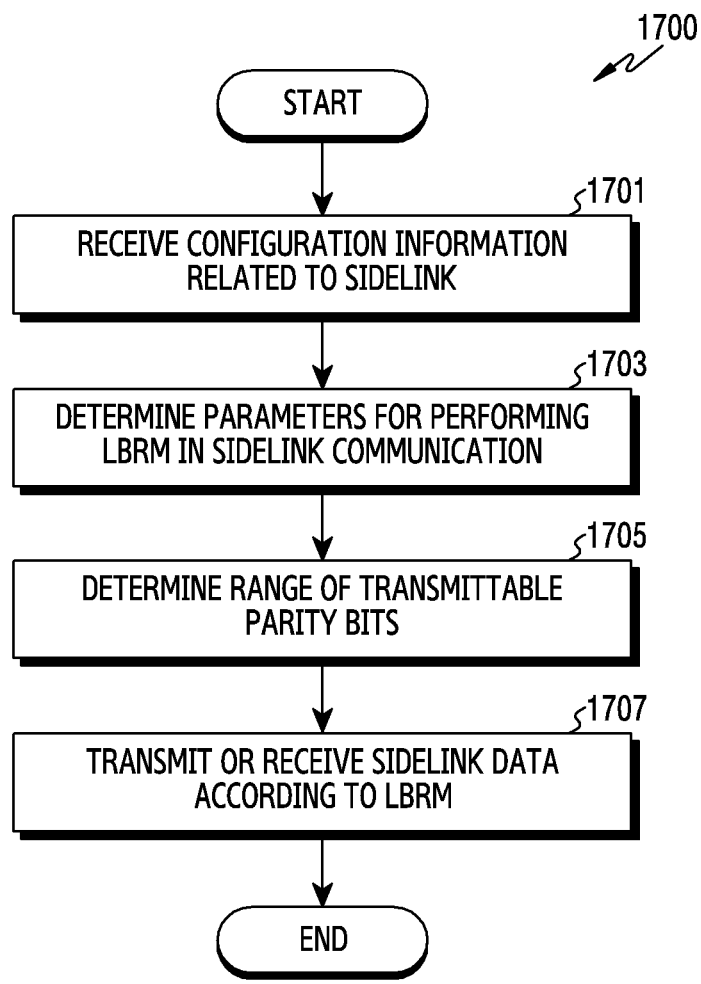
FIG. 17 illustrates a flowchart of a terminal for transmitting or receiving sidelink data in a wireless communication system according to an embodiment of the disclosure.

FIG. 17 illustrates a flowchart 1700 of a terminal for transmitting or receiving sidelink data in a wireless communication system according to an embodiment of the disclosure. FIG. 17 illustrates a method for operating a terminal 120.

Referring to FIG. 17, in operation 1701, a terminal receives configuration information related to a sidelink. The configuration information related to a sidelink may include at least one of information on a resource pool for sidelink communication, information on the structure of a channel, and parameters required for data transmission/reception. According to an embodiment of the disclosure, the configuration information related to a sidelink may include information related to parameters required for performing LBRM.

In operation 1703, the terminal determines parameters required for performing LBRM. For example, parameters required for performing LBRM may include an input variable of an equation for determining a configuration value required for an LBRM operation, or another variable for determining an input variable. For example, configuration information related to a sidelink may include at least one of the number of HARQ processes, the maximum layer number, a maximum modulation order, the total number of RBs, and the total number of PRBs.

In operation 1705, the terminal may determine a range of transmittable parity bits according to LBRM. The LBRM corresponds to a technique which treats a part of parity bits as transmittable bits and transmits at least one buffer among the transmittable bits through a channel. For example, as described with reference to FIG. 11, bits within a limited range indicated by $N_{ab}$, among parity bits generated from a code block are transmittable, and other remaining bits are not transmitted even through the RV thereof is changed. Accordingly, the terminal may determine the range within which to treat bits, among all parity bits, as transmittable or receivable bits. An operation of treating bits as transmittable bits may be performed by inputting the bits into a circular buffer.

In operation 1707, the terminal transmits or receives sidelink data according to LBRM. In other words, in performing encoding and decoding, the terminal performs encoding and decoding based on parity bits within a limited range. When receiving data, the terminal may employ a buffer having a size corresponding to the limited range in order to buffer the received data. When transmitting data, the terminal may generate parity bits by encoding an information bit and may include at least one parity bit selected within the limited range, among the generated parity bits, in transmission data.

As described with reference to FIG. 17, the terminal may perform LBRM. In order to perform LBRM, the terminal determines a limited range for parity bits. To this end, it is required to determine a parameter required for determining the limited range. Hereinafter, embodiments for determining a parameter required for determining the limited range will be described.

(1) Determine the Number of HARQ Processes

Hereinafter, the disclosure describes embodiments for determining the number of HARQ processes of a terminal which performs sidelink communication.

There may be a need for a terminal to know the number of available HARQ processes when the terminal receives data. For example, when the terminal transmits one TB to another terminal through a PSSCH, a transmission terminal may include an HARQ process ID in SCI for scheduling the PSSCH. A reception terminal may decode the SCI, and then select a reception method, such as HARQ combining based on an HARQ process ID value indicating an HARQ process number, a new data indicator (NDI) indicating whether HARQ is initial transmission or retransmission, an HARQ redundancy version (RV) value, or the like, and attempt decoding of the PSSCH.

In this case, a bit field including information on an HARQ process number included in SCI may be determined according to the maximum number of HARQ processes or the total number of HARQ processes. For example, when the maximum number of HARQ processes is 16, a bit field of 4 bits may indicate the HARQ process number. Accordingly, in order to generate and analyze SCI, each of a transmission terminal and a reception terminal which perform sidelink communication needs to know information on the maximum number of HARQ processes, applied by the other. Configuration information relating to a resource pool used for sidelink communication and other configuration information for sidelink communication may be preinstalled when the terminal is manufactured, may be configured by the current base station, may be pre-configured from another base station or another network unit before the terminal accesses the current base station, may be a fixed value, may be provisioned from a network, or may be independently self-constructed. The total number of HARQ processes used for sidelink communication may be defined by one embodiment or a combination of two or more embodiments among the following embodiments.

Embodiment 1: The total number of HARQ processes is determined according to a sidelink carrier, serving cell, or BWP. According to an embodiment of the disclosure, configuration information of the carrier, serving cell, or BWP may include a value indicating the number of HARQ processes. A terminal may identify the total number of HARQ processes corresponding to the carrier, serving cell, or BWP by identifying the value indicating the number of HARQ processes in the configuration information of the carrier, serving cell, or BWP. According to another embodiment of the disclosure, information on a relationship between the carrier, serving cell, or BWP and the number of HARQ processes may be provided as system information.

Embodiment 2: The total number of HARQ processes is defined according to a sidelink resource pool. In an embodiment of the disclosure, configuration information of a resource pool may include a value indicating the number of HARQ processes. A terminal may identify the total number of HARQ processes corresponding to the resource pool by identifying the value indicating the number of HARQ processes in the configuration information of the resource pool. According to another embodiment of the disclosure, as sidelink-related control information, information on a relationship between the resource pool and the number of HARQ processes may be provided as system information.

Embodiment 3: The total number of HARQ processes is defined according to a cast type (e.g., unicast, groupcast, or broadcast) operated in a resource pool. A terminal may distinguish between unicast, groupcast, and broadcast based on a SCI format, a particular bit field included in the SCI, or a resource pool to be used.

Embodiment 4: The requirement for the number of HARQ processes that can be used by a terminal in a sidelink carrier or BWP or a resource pool is defined.

Information on the above-defined total number of HARQ processes as well as the above-described configuration information relating to the resource pool may be preinstalled when the terminal is manufactured, may be configured by the current base station, may be pre-configured from another base station or another network unit before the terminal accesses the current base station, may be a fixed value, may be provisioned from a network, or may be independently self-constructed.

(2) Determine FBRM and LBRM

Hereinafter, the disclosure describes embodiments in which a PSSCH is mapped to a given resource when a terminal transmits or receives the PSSCH. When the length of a circular buffer is indicated by $N_{cb}$, and the number of all parity bits generated by LDPC coding is indicated by N, $N_{cb}=N$, in the case of a FBRM scheme. In the case of a LBRM scheme, $N_{cb}$ may be determined according to $N_{cb}=\min(N, N_{ref})$, where $$N_{ref} = \left\lfloor \frac{TBS_{LBRM}}{C \cdot R_{LBRM}} \right\rfloor$$

and $R_{LBRM}=2/3$. The above-described method of determining a TBS may be used to determine $TBS_{LBRM}$. Here, C indicates the actual number of code blocks of the TB being scheduled. $TBS_{LBRM}$ may be a value that a terminal needs to know when transmitting or receiving a data signal or a PSSCH. For example, in the case of transmission, the terminal determines the rate-matching method based on the value of $TBS_{LBRM}$. For example, in the case of reception, the terminal may determine which particular code block to receive, and from which part to receive the same, and may perform decoding, based on the value of $TBS_{LBRM}$. The number of layers may be assumed to be the maximum layer number supported by the terminal in the corresponding cell. The modulation order may be assumed to be the maximum modulation order configured in the terminal in the corresponding cell, or to be 64-QAM when no maximum modulation order is configured. The code rate may be assumed to be 948/1024, which is the maximum code rate. $N_{RE}$ may be assumed to be $N_{RE}=156 \cdot n_{PRB}$. $n_{PRB}$ may be assumed to be $n_{PRB}=n_{PRB,LBRM}$.

In sidelink transmission, in order to determine whether to apply FBRM (i.e., a determination method based on $N_{cb}=N$) or NBRM (i.e., a determination method based on $N_{cb}=\min(N,N_{ref})$), one of the following methods or a combination of two or more following methods may be used.

Embodiment 1: Whether to use FBRM or LBRM is configured according to a resource pool. In this case, configuration information of the resource pool may include a value indicating whether to use LBRM. A terminal may identify the total number of HARQ processes corresponding to the resource pool by identifying the value indicating whether to use LBRM in the configuration information of the resource pool.

Embodiment 2: Whether to use FBRM or LBRM is determined according to a cast type (e.g., unicast, groupcast, or broadcast) of data to be transmitted or received. A terminal may distinguish between unicast, groupcast, and broadcast based on a SCI format, a particular bit included in the SCI, or a resource pool to be used.

Embodiment 3: For sidelink communication, LBRM is always used.

(3) Determine the Maximum Layer Number

Hereinafter, the disclosure describes embodiments for determining the maximum layer number, assumed when a parameter required for performing LBRM during sidelink signal transmission or reception is calculated.

The maximum layer number of a terminal, used to calculate $TBS_{LBRM}$ applied in the process of sidelink data or PSSCH transmission or reception is used as a value configured or pre-configured by a base station or by another network or manufacturer. However, if no configured or pre-configured value exists, the maximum layer number supported by the terminal may be used as the maximum layer number for $TBS_{LBRM}$ calculation. Further, when terminals have not exchanged UE capability parameters with each other, a default value may be used for the maximum layer number for $TBS_{LBRM}$ calculation. In this case, the default value may need to be defined. In the case of a general terminal, a base station may assume the default value to be 1 in FR1 and 1 in FR2, or to be 2 in FR1 and 1 in FR2, and calculate $TBS_{LBRM}$. Meanwhile, in the case of a terminal having low capability, the base station may assume the default value to be 2 in FR1 and 1 in FR2.

Various embodiments to be described below are for efficient sidelink LBRM (e.g., SL-SCH LBRM or PSSCH LBRM) in transmitting data. When PSSCH LBRM is applied, $TBS_{LBRM}$ may be determined based on the following configuration.

X, the maximum layer number for one TB may be determined as follows (maximum number of layers for one TB for SL-SCH is given by X, where).

TABLE 24

| Configuration | Description |
| --- | --- |
| 1 | If parameter maxMIMO-Layers included in higher-layer signaling SL-PSSCH TxParameters for a resource pool in a BWP of a serving cell is configured or pre-configured, X is determined based on the maxMIMO-Layers for each resource pool.<br>(If the higher layer parameter maxMIMO-Layers of SL-PSSCH-TxParameters of the resource pools of the BWP of the serving cell is (pre-) configured, X is given by that parameter. Here, 'that parameter' may indicate 'higher layer parameter maxMIMO-Layers of SL-PSSCH-TxParameters of the resource pools of the BWP of the serving cell'.) |
| 2 | When not corresponding to configuration 1, it is determined to be X = 1.<br>(otherwise, X is 1.) |

As described above, configuration 2 may be changed as described below and applied according thereto.

TABLE 25

| Configuration | Description |
| --- | --- |
| 2 | If not corresponding to configuration 1, it is determined to be X = 2 for FR1 operation, and X = 1 for FR2 operation. (otherwise, X is 2 for FR1 and 1 for FR2.) |

If retransmission in another resource pool for a given TB is allowed, different $TBS_{LBRM}$s may be applied for each resource pool, and which may deteriorate transmission or reception performance. Accordingly, if retransmission in another resource pool for a given TB is allowed, the same $TBS_{LBRM}$ is to be applied for all resource pools configured or pre-configured in one BWP. Accordingly, the above-described configuration 1 may be changed as described below and applied according thereto.

TABLE 26

| Configuration | Description |
| --- | --- |
| 1 | If parameter maxMIMO-Layers included in higher-layer signaling SL-PSSCH-TxParameters for all resource pools in a BWP of a serving cell is configured or preconfigured, X is determined based on the maximum value among maxMIMO-Layers for each of the resource pools.<br>(If the higher layer parameters maxMIMO-Layers of SL-PSSCH-TxParameters of all resource pools of the BWP of the serving cell are configured, X is given by the maximum value among maxMIMO-Layers of SL-PSSCH-TxParameters of all the resource pools.) |

In the embodiments of Table 24, Table 25, and Table 26, when the maximum layer number are configured for multiple resource pools, respectively, X is determined to be the maximum value among the maximum numbers of layers. According to another embodiment of the disclosure, X may be determined to be the minimum value among the maximum numbers of layers. According to still another embodiment of the disclosure, X may be determined to be a value (e.g., the mean value or the average value) determined based on the maximum numbers of layers.

(4) Determine the Maximum Modulation Order

Hereinafter, the disclosure describes embodiments for determining the maximum modulation order, which is assumed when a parameter required for performing LBRM during sidelink signal transmission or reception is calculated.

The maximum modulation order (Qm) of a terminal, used to calculate $TBS_{LBRM}$ applied in the process of transmitting or receiving sidelink data or a PSSCH is used as a value configured or pre-configured from a base station or by another network or manufacturer. However, if no configured or pre-configured value exists, the maximum layer number supported by the terminal may be used for the maximum modulation order. Further, when terminals have not exchanged UE capability parameters with each other, a default value may be used as the maximum modulation order. In this case, the default value may need to be defined. In the case of a general terminal, a base station may assume the default value to be Qm=4, that is, 16QAM, and calculate $TBS_{LBRM}$.

Various embodiments to be described below are for efficient sidelink LBRM (e.g., SL-SCH LBRM or PSSCH LBRM) in transmitting data. When PSSCH LBRM is applied, $TBS_{LBRM}$ may be determined based on the following configuration.

Qm, the maximum modulation order for one TB may be determined as follows. (maximum modulation order)

TABLE 27

| Configuration | Description |
| --- | --- |
| 1 | If parameter mcs-Table included in higher-layer signaling SL-PSSCH-TxParameters for a resource poll in a BWP of a serving cell is configured or preconfigured to "qam256", Qm is assumed to be 8. (If the higher layer parameter mcs-Table given by SL-PSSCH-TxParameters of the resource pools of the BWP of the serving cell is set to 'qam256', the maximum modulation order Qm = 8 is assumed for SL-SCH.) |
| 2 | If parameter mcs-Table included in higher-layer signaling SL-PSSCH-TxParameters for a resource pool in a BWP of a serving cell is configured or pre-configured to "qam64", Qm is assumed to be 6. (Else If the higher layer parameter mcs-Table given by SL-PSSCH-TxParameters of the resource pools of the BWP of the serving cell is set to 'qam64', the maximum modulation order Qm = 6 is assumed for SL-SCH.) |
| 3 | Otherwise, the maximum modulation order Qm is assumed to be 4. (otherwise, the maximum modulation order Qm = 4 is assumed for SL-SCH.) |

Configuration 1, configuration 2, and configuration 3 in Table 27 may be changed to configuration 1a, and configuration 2a as below.

TABLE 28

| Configuration | Description |
| --- | --- |
| 1a | If parameter mcs-Table included in higher-layer signaling SL-PSSCH-TxParameters for a resource pool in a BWP of a serving cell is configured or pre-configured to "qam256", Qm is assumed to be 8. |

TABLE 28-continued

| Configuration | Description |
|---|---|
| 2a | (If the higher layer parameter mcs-Table given by SL-PSSCH-TxParameters of the resource pools of the BWP of the serving cell is set to 'qam256', the maximum modulation order Qm = 8 is assumed for SL-SCH.) Otherwise, the maximum modulation order Qm is assumed to be 6. (otherwise, the maximum modulation order Qm = 6 is assumed for SL-SCH.) |

(5) Determine the Total Number of Resource Elements (REs)

Hereinafter, the disclosure describes embodiments for determining the total number of REs, which is assumed when a parameter required for performing LBRM during sidelink transmission or reception is calculated. As described above, in the NR technology of the related art, $N_{RE}$ may be assumed to be $N_{RE}=156 \cdot n_{PRB}$, and $n_{PRB}$ may be assumed to be $n_{PRB}=n_{PRB,LBRM}$, for $TBS_{LBRM}$ calculation. $n_{PRB,LBRM}$ may be defined as shown in Table 9 above.

Unlike the NR technology of the related art, in the case of sidelink communication, not all 14 symbols in one slot may be used. When an extended CP is used, not all 12 symbols in one slot may be used. FIG. 17 illustrates a general slot structure in sidelink. Referring to FIG. 17, it is identified that in addition to PSCCH/PSSCH transmission, at least one symbol is used at the end of a slot in order to secure a gap time for a time for transmission or reception switching by a terminal. Accordingly, in the equation of $N_{RE}=156 \cdot n_{PRB}$ used in the NR technology of the related art, 156 is to be replaced with a smaller value.

In the NR technology of the related art, the equation $N_{RE}=156 \cdot n_{PRB}$ may be applied when it is assumed that one symbol in a total of 168 REs existing in 14 symbols-1 PRB is used for a DMRS, and approximately 156 REs are used for PSSCH mapping in 14 symbols-1 PRB. However, in a sidelink operation, since one symbol among 14 symbols is used for the DMRS and at least one symbol may be additionally used for a gap, it is preferable to replace 156 to with another value in the equation $N_{RE}=156 \cdot n_{PRB}$. For example, $N_{RE}$ may be determined to be Equation 2 below. For example, it may be assumed that data is mapped to a smaller number of REs for each PRB when LBRM is applied in a sidelink operation, compared to when LBRM is applied in an uplink and downlink operation between a terminal and a base station.

$$N_{RE}=144 \cdot n_{PRB} \qquad \text{Equation 2}$$

In Equation 2, $N_{RE}$ indicates the total number of REs, which is assumed when calculating a parameter required for performing LBRM, and $n_{PRB}$ indicates the total number of PRBs, which is assumed when calculating a parameter required for performing LBRM. Here, $n_{PRB}$ may be defined as shown in Table 29 below.

TABLE 29

| Total number of PRBs configured/allocated for a corresponding resource pool | $n_{PRB}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The above-described method may be expressed as in Equation 3 below.

$$N_{RE}=X \cdot n_{PRB} \qquad \text{Equation 3}$$

In Equation 3, $N_{RE}$ indicates the total number of REs, which is assumed when calculating a parameter required for performing LBRM, and $n_{PRB}$ indicates the total number of PRBs, which is assumed when calculating a parameter required for performing LBRM. Here, X may change depending on whether a PSFCH resource is configured. For example, if no PSFCH resource is configured for a sidelink slot, X may be determined to be 144, and if no PSFCH resource is configured for a sidelink slot, X may be determined to be 120. For example, X may be defined as the value smaller than the number of REs per PRB, which is assumed when LBRM is applied to a downlink or an uplink. In the description above, a value of X is exemplified as 144 and 120, but may be changed to another value.

As described above, in determining the total number of REs, which channel is configured to a resource pool may be considered. For example, the total number of REs may change depending on whether the PSFCH resource is configured, and whether the PSFCH resource is configured is dependent on whether ACK feedback is supported in the corresponding resource pool.

According to an embodiment of the disclosure, when a terminal uses multiple resource pools, the terminal may assume the total number of REs for each of the resource pools. In this case, the terminal may determine the total number of REs independently for each of the resource pools. A method of assuming the total number of REs for each of the resource pools enables an LBRM operation to be optimized for each of the resource pools.

When a terminal uses multiple resource pools, the terminal may assume the total number of REs, which is commonly applied to the multiple resources, or when the commonly-applied total number of REs is assumed, the terminal may determine the total number of REs for each of the resource pools, and may then commonly apply the minimum value among the determined values to the multiple resource pools. Alternatively, the terminal may determine the commonly applied total number of REs according to another rule or equation defined for the case where multiple resource pools are used.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented embodiments of the disclosure. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, configuration information including information on a resource pool for a sidelink communication;
   determining at least one limited-buffer rate-matching (LBRM) parameter for the sidelink communication based on the received configuration information; and
   transmitting or receiving sidelink data based on a limited range of parity bits for the LBRM determined based on the at least one LBRM parameter,
   wherein the at least one LBRM parameter comprises a number of hybrid automatic repeat request (HARQ) processes supported for sidelink communication, and
   wherein the number of HARQ processes is determined based on the information on the resource pool configured by the base station and information on a cast type indicating a communication method with at least one terminal, the cast type comprising at least one of a unicast, a groupcast, or a broadcast.

2. The method of claim 1,
   wherein the number of HARQ processes is further determined based on at least one of a carrier, a serving cell, a bandwidth part (BWP), or a sidelink control information (SCI) format, which are used for the sidelink communication.

3. The method of claim 1,
   wherein the at least one LBRM parameter comprises information indicating whether to perform the LBRM, and
   wherein whether to perform the LBRM is determined based on at least one of the resource pool, the cast type, or a sidelink control information (SCI) format, which are used for the sidelink communication.

4. The method of claim 1,
   wherein the at least one LBRM parameter comprises a maximum layer number, and
   wherein the maximum layer number is determined based on a value indicated by higher-layer signaling related to the sidelink communication, or based on a frequency range (FR) to which a frequency used for the sidelink communication belongs.

5. The method of claim 4, wherein, when maximum numbers of layers are configured for multiple resource pools, respectively, the maximum layer number is determined based on the configured maximum numbers.

6. The method of claim 5, wherein the maximum layer number comprises one of a maximum value or a minimum value of the configured maximum numbers of layers.

7. The method of claim 1,
   wherein the at least one LBRM parameter comprises a maximum modulation order, and
   wherein the maximum modulation order is determined based on a modulation and coding scheme (MCS) value indicated by higher-layer signaling related to the sidelink communication.

8. The method of claim 7, wherein the maximum modulation order is determined to be a value smaller than the MCS value.

9. The method of claim 1,
   wherein the at least one LBRM parameter comprises a total number of resource elements (REs),
   wherein the total number of REs is determined as a product of a number of physical resource blocks (PRBs) and a variable, and
   wherein the variable is defined as a value smaller than a number of REs per PRB, which is assumed when LBRM is applied to a downlink or an uplink.

10. The method of claim 9, wherein the variable changes depending on whether acknowledge (ACK) feedback is supported in a corresponding resource pool.

11. The method of claim 9, wherein the variable is a value smaller than 156.

12. A terminal in a wireless communication system, the terminal comprising:
    a transceiver; and
    at least one processor operably coupled to the transceiver,
    wherein the at least one processor is configured to:
      receive, from a base station, configuration information including information on a resource pool for a sidelink communication,
      determine at least one limited-buffer rate-matching (LBRM) parameter for the sidelink communication based on the received configuration information, and
      transmit or receive sidelink data based on a limited range of parity bits for the LBRM determined based on the at least one LBRM parameter,
    wherein the at least one LBRM parameter comprises a number of hybrid automatic repeat request (HARQ) processes supported for the sidelink communication, and
    wherein the number of HARQ processes is determined based on the information on the resource pool configured by the base station and information on a cast type indicating a communication method with at least one terminal, the cast type comprising at least one of a unicast, a groupcast, or a broadcast.

13. The terminal of claim 12,
wherein the number of HARQ processes is further determined based on at least one of a carrier, a serving cell, a bandwidth part (BWP), or a sidelink control information (SCI) format, which are used for the sidelink communication.

14. The terminal of claim 12,
wherein the at least one LBRM parameter comprises information indicating whether to perform the LBRM, and
wherein whether to perform the LBRM is determined based on at least one of the resource pool, the cast type, or a sidelink control information (SCI) format, which are used for the sidelink communication.

15. The terminal of claim 12,
wherein the at least one LBRM parameter comprises a maximum layer number, and
wherein the maximum number of layers is determined based on a value indicated by higher-layer signaling related to the sidelink communication, or based on a frequency range (FR) to which a frequency used for the sidelink communication belongs.

16. The terminal of claim 15, wherein, when maximum numbers of layers are configured for multiple resource pools, respectively, the maximum layer number is determined based on the configured maximum numbers of layers.

17. The terminal of claim 16, wherein the maximum layer number comprises one of a maximum value or a minimum value of the configured maximum numbers of layers.

18. The terminal of claim 12,
wherein the at least one LBRM parameter comprises a maximum modulation order, and
wherein the maximum modulation order is determined based on a modulation and coding scheme (MCS) value indicated by higher-layer signaling related to the sidelink communication.

19. The terminal of claim 18, wherein the maximum modulation order is determined to be a value smaller than the MCS value.

20. The terminal of claim 12,
wherein the at least one LBRM parameter comprises a total number of resource elements (REs),
wherein the total number of REs is determined as a product of a number of physical resource blocks (PRBs) and a variable, and
wherein the variable is defined as a value smaller than a number of REs per PRB, which is assumed when LBRM is applied to a downlink or an uplink.

* * * * *